(12) United States Patent
Seo et al.

(10) Patent No.: US 9,167,596 B2
(45) Date of Patent: Oct. 20, 2015

(54) METHOD AND APPARATUS FOR TRANSMITTING AND RECEIVING SCHEDULING REQUEST USING SHARED RESOURCE BASED FILTERING IN RADIO COMMUNICATION SYSTEM

(75) Inventors: Han Byul Seo, Anyang-si (KR); Byoung Hoon Kim, Anyang-si (KR); Hak Seong Kim, Anyang-si (KN)

(73) Assignee: LG ELECTRONICS INC., Seoul (KR)

( * ) Notice: Subject to any disclaimer, the term of this patent is extended or adjusted under 35 U.S.C. 154(b) by 436 days.

(21) Appl. No.: 13/640,147

(22) PCT Filed: Apr. 12, 2011

(86) PCT No.: PCT/KR2011/002571
§ 371 (c)(1),
(2), (4) Date: Oct. 9, 2012

(87) PCT Pub. No.: WO2011/129582
PCT Pub. Date: Oct. 20, 2011

(65) Prior Publication Data
US 2013/0028221 A1    Jan. 31, 2013

Related U.S. Application Data

(60) Provisional application No. 61/323,323, filed on Apr. 12, 2010.

(51) Int. Cl.
| | |
|---|---|
| H04W 4/00 | (2009.01) |
| H04W 72/12 | (2009.01) |
| H04L 1/18 | (2006.01) |
| H04W 28/06 | (2009.01) |
| H04W 72/02 | (2009.01) |
| H04L 5/00 | (2006.01) |

(52) U.S. Cl.
CPC ......... *H04W 72/1284* (2013.01); *H04L 1/1861* (2013.01); *H04W 72/1278* (2013.01); *H04L 5/0037* (2013.01); *H04L 5/0055* (2013.01); *H04L 5/0094* (2013.01); *H04W 28/06* (2013.01); *H04W 72/02* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 7,583,691 B2 | 9/2009 | Martin | |
| 2008/0113684 A1 | 5/2008 | Jung et al. | |
| 2009/0086671 A1 | 4/2009 | Pelletier et al. | |
| 2009/0109908 A1* | 4/2009 | Bertrand et al. | 370/329 |

* cited by examiner

*Primary Examiner* — Jutai Kao
(74) *Attorney, Agent, or Firm* — Lee, Hong, Degerman, Kang & Waimey

(57) ABSTRACT

Disclosed herein is a method and apparatus for transmitting and receiving a scheduling request using a shared resource based filtering method in a radio communication system. The method for supporting scheduling request using shared resources at a base station including assigning each of one or more users to each of one or more subsets of Scheduling Request (SR) resources of a set consisting of a number, M, of SR resources, receiving scheduling request for the one or more users, determining SR resources used for the scheduling request among M SR resources, determining one or more users associated with the received scheduling request based on the assigned SR resources and the determined SR resources, and transmitting scheduling control information to determined one or more users.

16 Claims, 14 Drawing Sheets

FIG. 5

$n_{PRB} = N_{RB}^{UL} - 1$

| CQI | CQI |
|---|---|
| CQI+A/N | A/N |
| | A/N |
| | |
| DATA ||
| | |

| | |
|---|---|
| DATA ||
| | |
| A/N | |
| A/N | CQI+A/N |
| CQI | CQI |

$n_{PRB} = 0$

One Subframe

METHOD AND APPARATUS FOR TRANSMITTING AND RECEIVING SCHEDULING REQUEST USING SHARED RESOURCE BASED FILTERING IN RADIO COMMUNICATION SYSTEM

CROSS-REFERENCE TO RELATED APPLICATIONS

This application is the National Stage filing under 35 U.S.C. 371 of International Application No. PCT/KR2011/002571, filed on Apr. 12, 2011, which claims the benefit of U.S. Provisional Application Ser. No. 61/323,323, filed on Apr. 12, 2010, the contents of which are all hereby incorporated by reference herein in their entirety.

TECHNICAL FIELD

The present invention relates to a radio communication system, and more particularly, to a method and apparatus for transmitting and receiving a scheduling request using a shared resource based filtering in a radio communication system.

BACKGROUND ART

In a general radio communication system, an evolved Node B (eNB) may assign uplink resources to a User Equipment (UE), in order to enable the UE to perform uplink transmission to the eNB. In addition, a UE having data to be transmitted in uplink may transmit a Scheduling Request (SR) to an eNB to request uplink resource assignment.

Scheduling request methods include methods based on random access of a UE and methods enabling a UE to use a dedicated channel.

In the random access method, since a plurality of UEs share resources for a scheduling request, resource use efficiency is high, but scheduling requests of a plurality of UEs may collide with each other and thus time required to solve such collisions may result in considerable delays. In the method using the dedicated channel, since discriminable resources for a scheduling request are assigned to each UE, collision between UEs does not occur, but the amount of resources required for the scheduling request may be increased.

In addition, in the case where one UE transmits scheduling requests for a plurality of uplink transmissions (that is, a plurality of uplink traffic flows) to an eNB, each scheduling request for each uplink traffic flow may be transmitted to the eNB.

DISCLOSURE

Technical Problem

An object of the present invention devised to solve the problem lies in a method for reducing collision between scheduling requests for a plurality of uplink transmissions (or uplink traffic flows) and reducing delay encountered for scheduling uplink transmission resources to a User Equipment (UE).

Another object of the present invention devised to solve the problem lies in a method and apparatus which employ sharing resources for a plurality of scheduling requests and discriminating the scheduling requests so as to increase scheduling request detection accuracy and reduce scheduling request signaling overhead.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for supporting scheduling request using shared resources at a base station including assigning each of one or more users to each of one or more subsets of Scheduling Request (SR) resources of a set consisting of a number, M, of SR resources, receiving scheduling request for the one or more users, determining SR resources used for the scheduling request among M SR resources, determining one or more users associated with the received scheduling request based on the assigned SR resources and the determined SR resources, and transmitting scheduling control information to determined one or more users.

In another aspect of the present invention, provided herein is a method for transmitting scheduling request using shared resources at a User Equipment (UE) including receiving assignment information assigning the UE to one or more subsets of Scheduling Request (SR) resources of a set consisting of a number, M, of SR resources, transmitting scheduling request using SR resources of the one or more subsets of SR resources based on the assigning information, and receiving scheduling control information if SR resources used for the scheduling request among M SR resources are determined by a base station and if the UE is determined as a user associated with the transmitted scheduling request based on the assigned SR resources and determined SR resources by the base station.

In another aspect of the present invention, provided herein is a base station for supporting scheduling request using shared resources including a reception module for receiving uplink signal from one or more users, a transmission module for transmitting downlink signal to the one or more users, and a processor for controlling the base station including the reception module and the transmission module, wherein the processor is configured to assign each of the one or more users to each of one or more subsets of Scheduling Request (SR) resources of a set consisting of a number, M, of SR resources, receive, through the reception module, scheduling request for the one or more users, determine SR resources used for the scheduling request among M SR resources, determine one or more user associated with the received scheduling request based on the assigned SR resources and the determined SR resources, and transmit, through the transmission module, scheduling control information to determined one or more user.

In another aspect of the present invention, provided herein is a User Equipment (UE) for transmitting scheduling request using shared resources including a reception module for receiving downlink signal from a base station, a transmission module for transmitting uplink signal to the base station, and a processor for controlling the UE including the reception module and the transmission module, wherein the processor is configured to receive, through the reception module, assignment information assigning the UE to one or more subsets of Scheduling Request (SR) resources of a set consisting of a number, M, of SR resources, transmit, through the transmission module, scheduling request using SR resources of the one or more subsets of SR resources based on the assigning information, and receive, through the reception module, scheduling control information if SR resources used for the scheduling request among M SR resources are determined by the base station and if the UE is determined as a user associated with the transmitted scheduling request based on the assigned SR resources and determined SR resources by the base station.

In another aspect of the present invention, provided herein is a relay station for supporting scheduling request using shared resources including a first reception module for receiving downlink signal from a base station, a first transmission module for transmitting uplink signal to the base station, a second reception module for receiving uplink signal from one or more users, a second transmission module for transmitting downlink signal to the one or more users, and a processor for controlling the relay station including the reception module and the transmission module, wherein the processor is configured to receive, through the first reception module, assignment information assigning the UE to one or more subsets of Scheduling Request (SR) resources of a set consisting of a number, M, of SR resources, receive, through the second reception module, uplink scheduling request for the one or more users, generate downlink scheduling request for the one or more users, generate a M-bit length bit sequence by aggregating the uplink scheduling request for the one or more users or the downlink scheduling request for the one or more users, and transmitting, through the first transmission module, the M-bit length bit sequence to the base station.

The following matters are applicable to the embodiments of the present invention.

Each of one or more subsets of SR resources may consist of a plurality number, K, K<M, of SR resources. A portion of the plurality number of SR resources consisting one subset of SR resources overlaps a portion of the plurality number of SR resources consisting another subset of SR resources. The plurality number of SR resources consisting one subset of SR resources may be determined by hash function using an identifier of one user.

The step of determining SR resources may include generating a M-bit length bit sequence in accordance with whether a signal is detected on each of M SR resources. Each bit of the M-bit length bit sequence may be set as first logical value if the signal is detected exists on a SR resource corresponding to the each bit and may be set as second logical value if no signal is detected on a SR resource corresponding to the each bit. The signal may be determined to be detected on a SR resource if a power of signal is greater than or equal to a predetermined reference value on the SR resource.

The determining one or more user may include determining the scheduling request for one user is received if the SR resources determined as being used for the scheduling request include all of the SR resources consisting one subset of SR resources assigned to the one user.

M SR resources may be configured as orthogonal resources by one or combination of two or more of time resource, frequency resource and code resource.

One or more of M and K may be determined based on a number of users.

The scheduling request for the one or more users may be received at the base station via a relay station, a M-bit length bit sequence may be generated by aggregating the scheduling request from the one or more users by the relay station, and the M-bit length bit sequence may be transmitted to the base station.

The scheduling request may be a downlink scheduling request for a downlink transmission from the base station to the one or more user via a relay station, a M-bit length bit sequence indicating the downlink scheduling request for the one or more users may be generated by the relay station and transmitted to the base station.

Each of the one or more the users may be a user equipment or a traffic flow.

The above general description of the present invention and a detailed description thereof which will be described hereinbelow are exemplary and are for an additional description of the invention disclosed in the accompanying claims.

Advantageous Effects

According to the present invention, it is possible to reduce collision between scheduling requests for a plurality of uplink traffic flows from one or more user equipments and reduce time delay. In addition, by applying a method of sharing resources for a plurality of scheduling requests and discriminating scheduling requests, it is possible to provide a method and apparatus capable of increasing scheduling request detection accuracy and scheduling request signaling overhead. The method of transmitting and receiving the scheduling request according to the present invention is particularly efficiently used in the case where the number of UEs which performs uplink transmission is increased (e.g., machine-to-machine communication) and in the case where the number of uplink traffic flows transmitted from one user equipment is increased (e.g., an uplink multi-transmission-block transmission method).

The effects obtained from the present invention are not limited to the above-described effect and other effects that are not mentioned herein will be clearly understood to those skilled in the art from the following description of the present invention.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a diagram showing a resource mapping structure of a PUCCH.

BEST MODE

Figure 1:
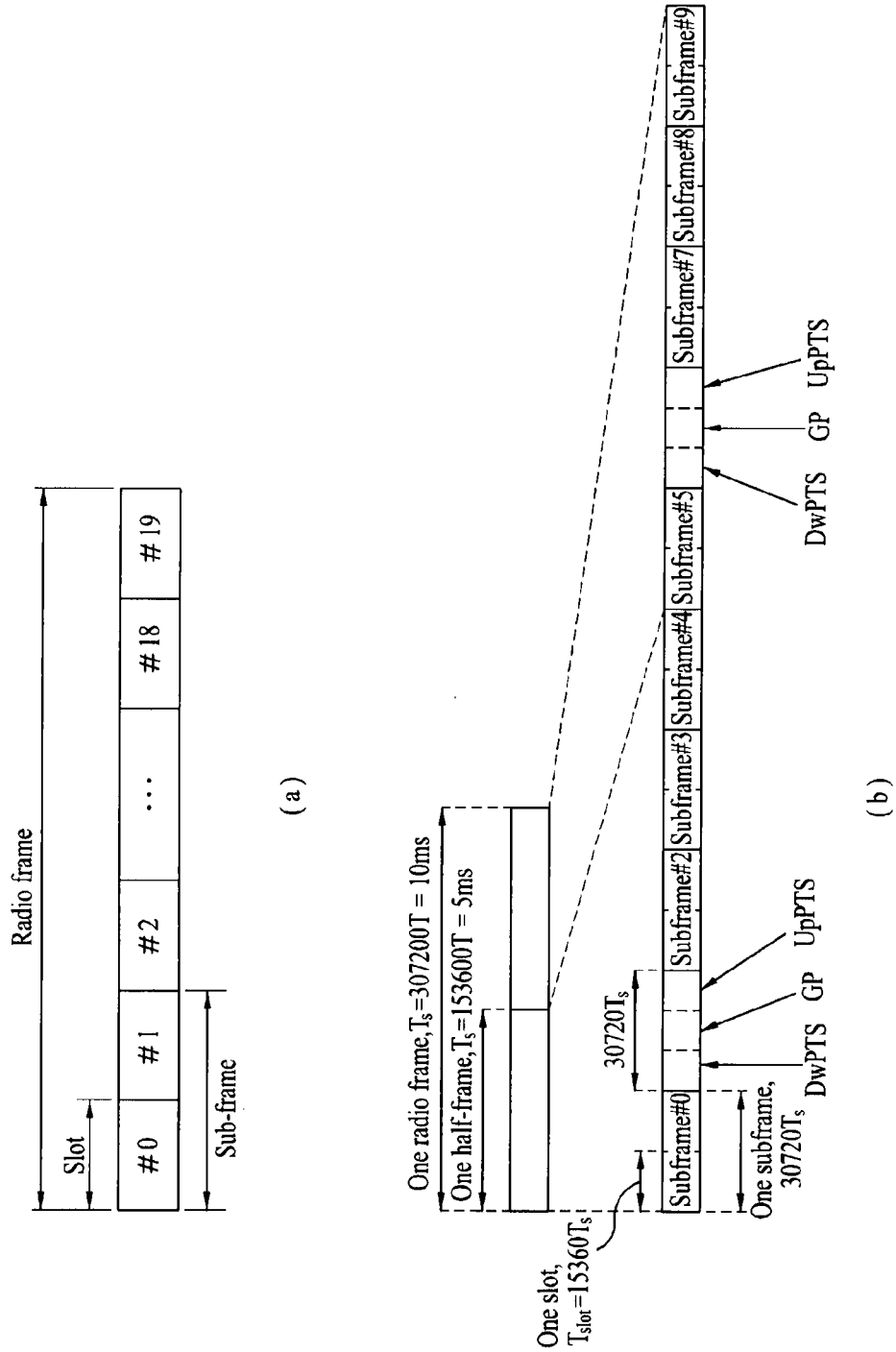
FIG. 1 shows the structure of a downlink radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(*a*) is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be assigned to a Physical Downlink Control Channel (PDCCH) and the remaining OFDM symbols may be assigned to a Physical Downlink Shared Channel (PDSCH).

FIG. 1(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 2:
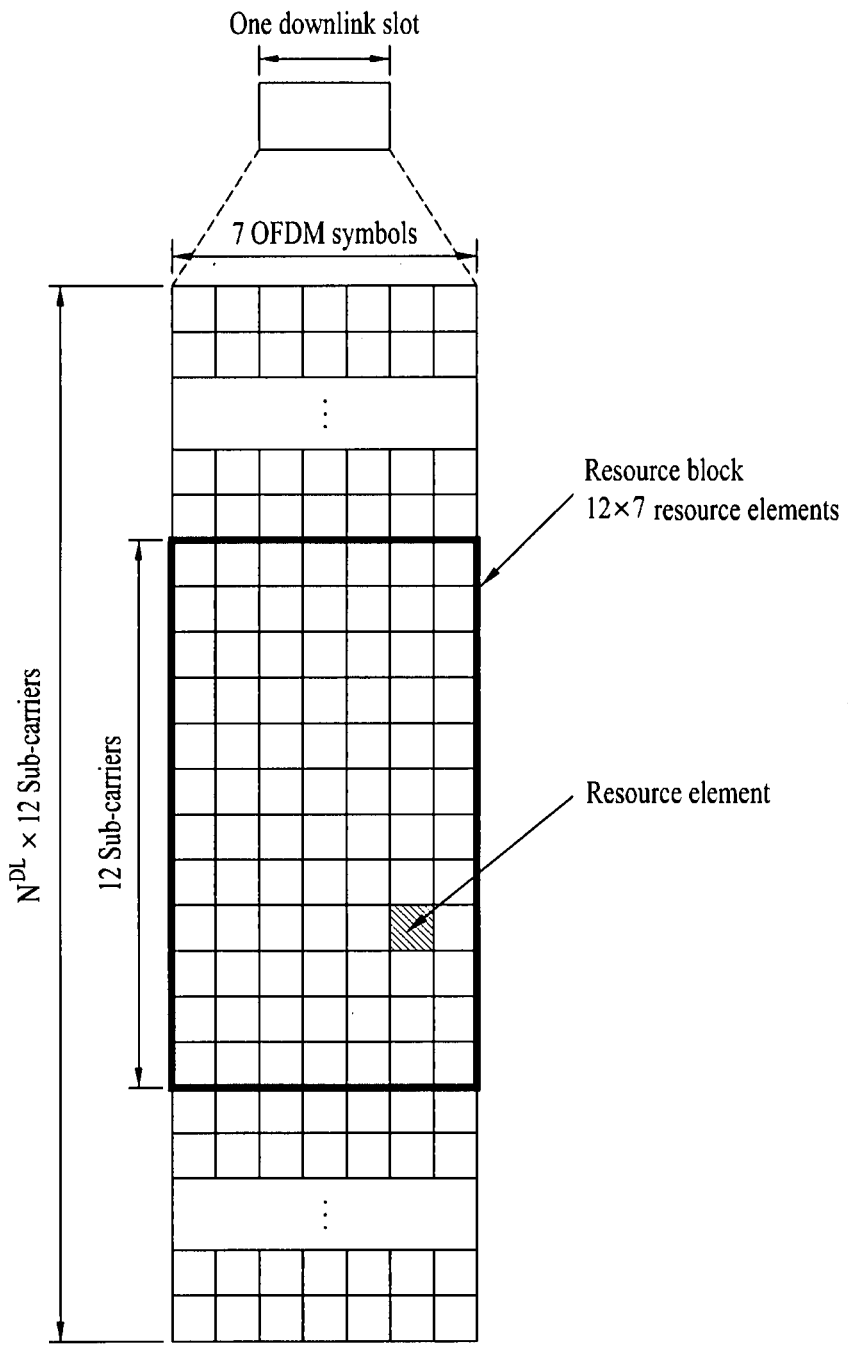
FIG. 2 shows a resource grid in a downlink slot.

FIG. 2 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12 (7 resource elements. The number NDL of RBs included in the downlink slot is determined based on a downlink transmission bandwidth. The structure of the uplink slot may be equal to the structure of the downlink slot.

Figure 3:
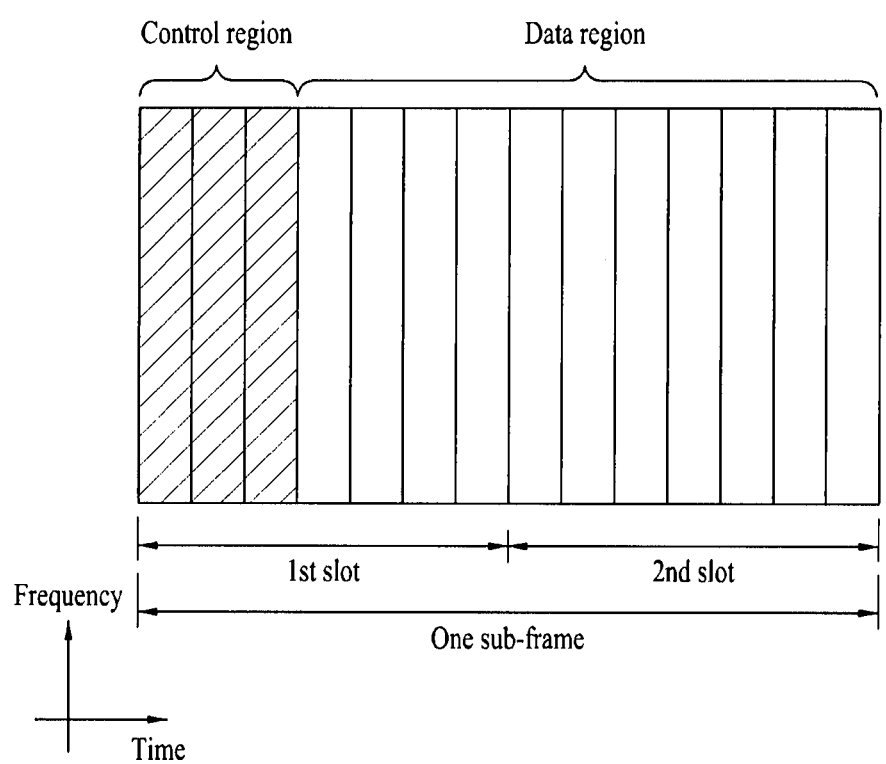
FIG. 3 shows the structure of a downlink subframe.

FIG. 3 is a diagram showing the structure of a downlink subframe. A maximum of three OFDM symbols of a front portion of a first slot within one subframe corresponds to a control region to which a control channel is allocatedassigned. The remaining OFDM symbols correspond to a data region to which a Physical Downlink Shared Channel (PDSCH) is allocatedassigned. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
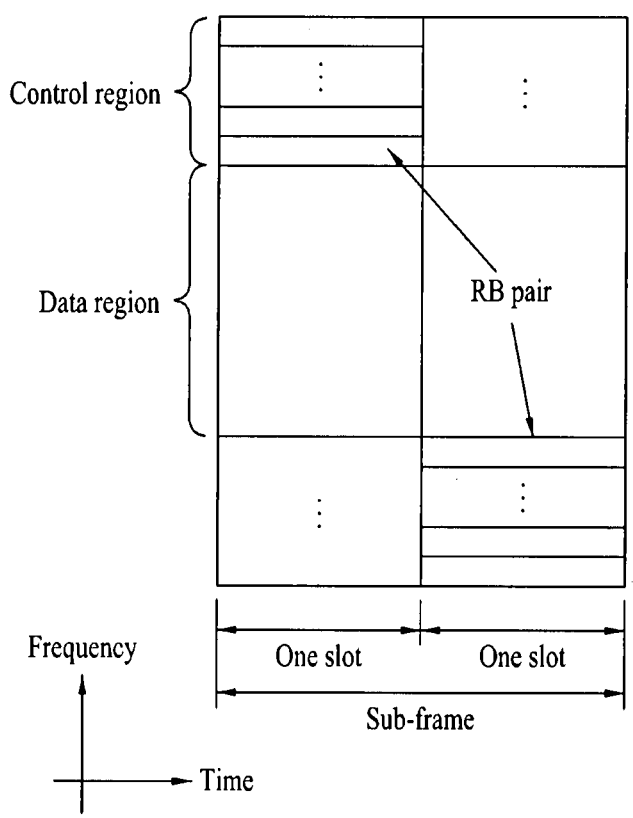
FIG. 4 shows the structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is assigned to the control region. A Physical uplink Shared Channel (PUSCH) including user data is assigned to the data region. In order to maintain single carrier property, one UE does not simultaneously transmit the PUCCH and the PUSCH. The PUCCH for one UE is assigned to a RB pair in a subframe. RBs belonging to the RB pair occupy different subcarriers with respect to two slots. Thus, the RB pair assigned to the PUCCH is "frequency-hopped" at a slot boundary.

Hereinafter, a PUCCH for transmitting uplink control information will be described in greater detail.

A PUCCH may be modulated using a Binary Phase Shift Keying (BPSK) scheme or a Quadrature Phase Shifting Keying (QPSK) scheme. A plurality of pieces of control information of a UE may be transmitted though a PUCCH. When Code Division Multiplexing (CDM) is performed in order to discriminate signals of UEs, a Constant Amplitude Zero Autocorrelation (CAZAC) sequence having a length of 12 is mainly used. Since the CAZAC sequence has a property that a constant amplitude is maintained in a time domain and a frequency domain, a Peak-to-Average Power Ratio (PAPR) of a UE may be decreased to increase coverage.

In addition, the control information transmitted through the PUCCH may be discriminated using cyclically shifted sequences having different cyclic shift values. A cyclically shifted sequence may be generated by cyclically shifting a basic sequence by a specific cyclic shift (CS) amount. The specific CS amount is indicated by a CS index. The number of available CSs may be changed according to channel delay spread. Various sequences may be used as the basic sequence and examples thereof include the above-described CAZAC sequence.

Uplink control information transmitted through a PUCCH may include a scheduling request (SR), an Acknowledgement (ACK)/Negative ACK (NACK) for downlink transmission, downlink channel measurement information, etc. The channel measurement information may include a Channel Quality Indicator (CQI), a Precoding Matrix Index (PMI) and a Rank Indicator (RI), which are collectively called CQI.

A PUCCH format is defined according to the kind of control information included in a PUCCH, a modulation method, etc. For example, a PUCCH format 1 may be used for SR transmission, a PUCCH format 1a or 1b may be used for ACK/NACK transmission, a PUCCH format 2 may be used for CQI transmission, and a PUCCH format 2a/2b may be used for CQI and HARQ ACK/NACK transmission.

In a certain subframe, PUCCH format 1a or 1b is used only if the ACK/NACK is transmitted, and the PUCCH format 1 is used only if the SR is transmitted. A UE may transmit the ACK/NACK and the SR in the same subframe.

FIG. 5 is a diagram showing a resource mapping structure of a PUCCH in an uplink physical resource block. $N_{RB}^{UL}$ denotes the number of resource blocks in uplink and $n_{PRB}$ denotes a physical resource block number. The PUCCH may be mapped to both edges of an uplink frequency block. CQI resources may be mapped to a physical resource block next to an edge of a frequency band and the ACK/NACK may be mapped next thereto.

Hereinafter, PUCCH formats will be described in detail.

Prior to the description of the PUCCH format 1 for SR transmission, the PUCCH formats 1a and 1b for ACK/NACK transmission will be described.

In PUCCH format 1a/1b, a symbol modulated using a BPSK or QPSK modulation scheme is multiplied by a CAZAC sequence having a length of 12 and then is spread to an orthogonal sequence block-wise. A Hadmard sequence having a length of 4 is used for general ACK/NACK information and a Discrete Fourier Transform (DFT) sequence having a length of 3 is used for shortened ACK/NACK information and a reference signal. In the extended CP, a Hadmard sequence having a length of 2 is used for a reference signal.

Figure 6:
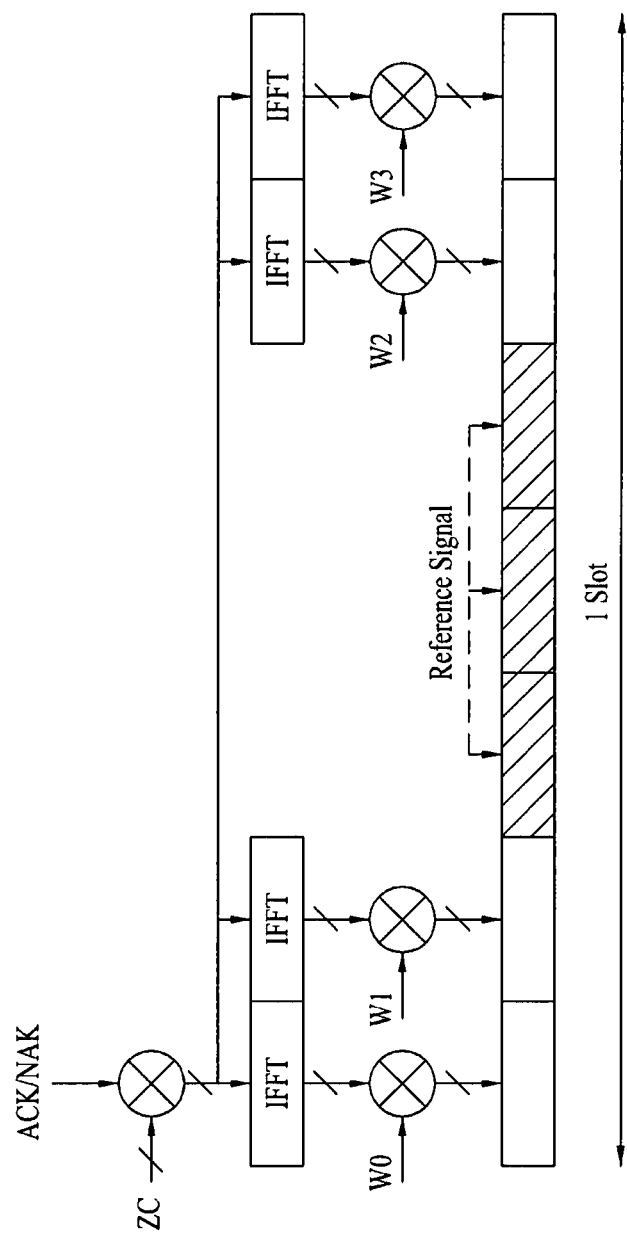
FIG. 6 is a diagram showing the structure of an ACK/NACK channel.

FIG. 6 is a diagram showing the structure of an ACK/NACK channel in a normal CP. A reference signal is carried in three consecutive symbols of a middle portion of seven OFDM symbols included in one slot and an ACK/NACK signal is carried in the four remaining OFDM symbols. The number of symbols used in the reference signal and the positions of the symbols may be changed according to the control channel and the number of symbols used in the ACK/NACK signals associated therewith and the positions of the symbols may be changed according to the control channel. The number of ACK/NACK channels per resource block may be 12, 18 or 36 in the normal CP and be 8 or 12 in the extended CP.

When a control signal is transmitted within an assigned band, two-dimensional spreading is applied in order to increase multiplexing capacity. That is, in order to increase the number of multiplexed UEs or the number of control channels, frequency domain spreading and time domain spreading are simultaneously applied. In order to spread the ACK/NACK signal in the frequency domain, a frequency domain sequence is used as a basic sequence. As the frequency domain sequence, a Zadoff-Chu (ZC) sequence, which is one kind of CAZAC sequence, may be used. The ACK/NACK signal spread in the frequency domain is subjected to IFFT and is spread in the time domain using a time domain sequence. For example, the ACK/NACK signal may be spread using an orthogonal sequence w0, w1, w2 and w3 having a length of 4 with respect to four symbols. In addition, the reference signal is also spread through an orthogonal sequence having a length of 3. This is called Orthogonal Code Covering (OCC).

Examples of a sequence used to spread the ACK/NACK information are shown in Tables 1 and 2. Table 1 shows a sequence having 4 symbols and Table 2 shows a sequence having 3 symbols. The sequence having 4 symbols is used in the PUCCH format 1/1a/1b of a general subframe configuration. In the subframe configuration, in consideration of the case where a Sounding Reference Signal (SRS) is transmitted at a last symbol of a second slot, a sequence having 4 symbols is applied to the first slot and the shortened PUCCH format 1/1a/1b of a sequence having 3 symbols may be applied to the second slot.

TABLE 1

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

TABLE 2

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

An example of orthogonal sequences used to spread the reference signal of the ACK/NACK channel is shown in Table 3.

TABLE 3

| Sequence index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 7:
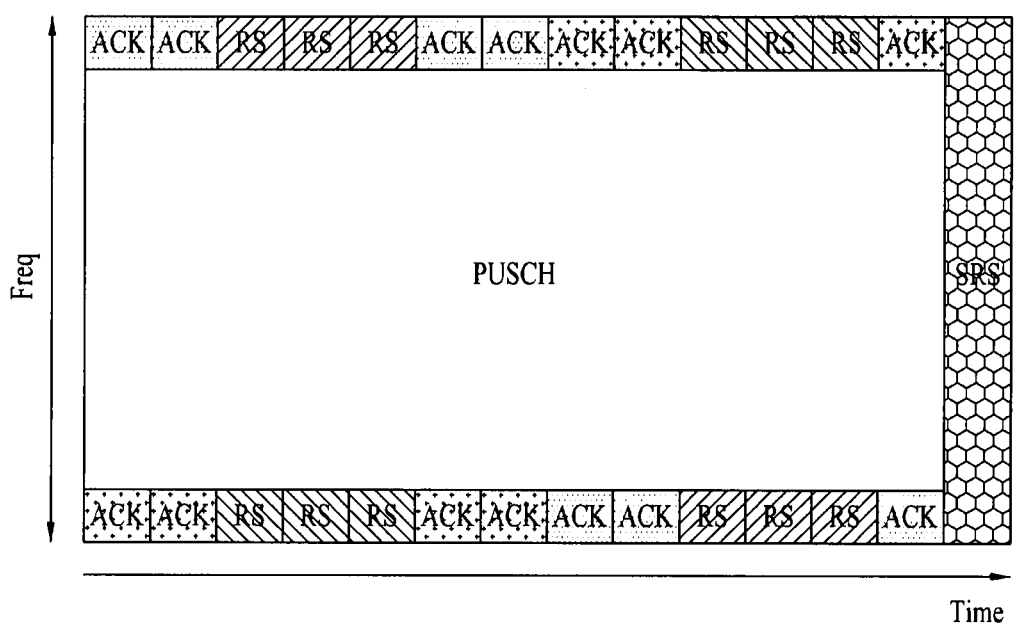
FIG. 7 is a diagram showing a resource mapping structure in the case where a shortened ACK/NACK format is applied.

FIG. 7 is a diagram showing a resource mapping structure in the case where a shortened ACK/NACK format is applied. The shortened ACK/NACK format is used when the ACK/NACK and the SRS are simultaneously transmitted. The shortened ACK/NACK format may be set by higher layer signaling.

Next, the PUCCH format 1 for SR transmission will be described.

The SR is transmitted such that a UE requests or does not request scheduling. The SR channel reuses an ACK/NACK channel structure of the PUCCH format 1a/1b and employs On-Off Keying (OOK) based on ACK/NACK channel design. That is, the SR is transmitted when a signal is transmitted through SR transmission resources with predetermined power or energy or more, and no signal is transmitted through SR transmission resources when the SR is not transmitted.

The reference signal is not transmitted through the SR channel. Accordingly, a sequence having a length of 7 is used in the normal CP and a sequence having a length of 6 is used in the extended CP. Different CSs or orthogonal covers may be assigned to the SR and the ACK/NACK.

Figure 8:
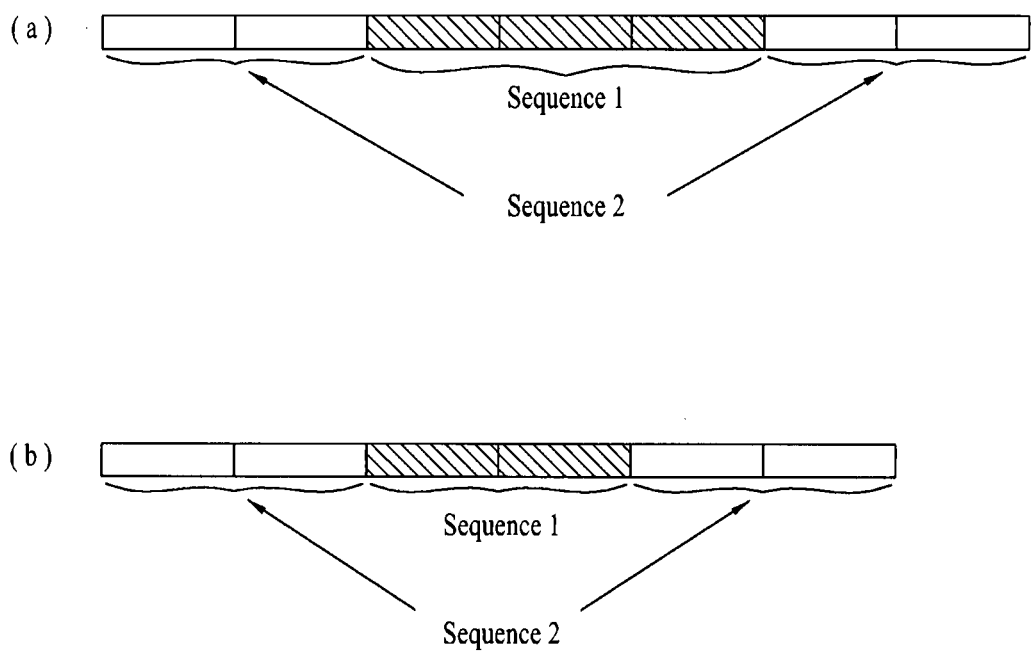
FIG. 8 is a diagram showing the structure of an SR channel on one slot.

FIG. 8 is a diagram showing the structure of an SR channel on one slot. Referring to FIG. 8(a), in the normal CP, a sequence having a length of 7 is divided into two orthogonal sequences (a sequence 1 and a sequence 2). Referring to FIG. 8(b), in the extended CP, a sequence having a length of 6 is divided into two orthogonal sequences (a sequence 1 and a sequence 2).

Figure 9:
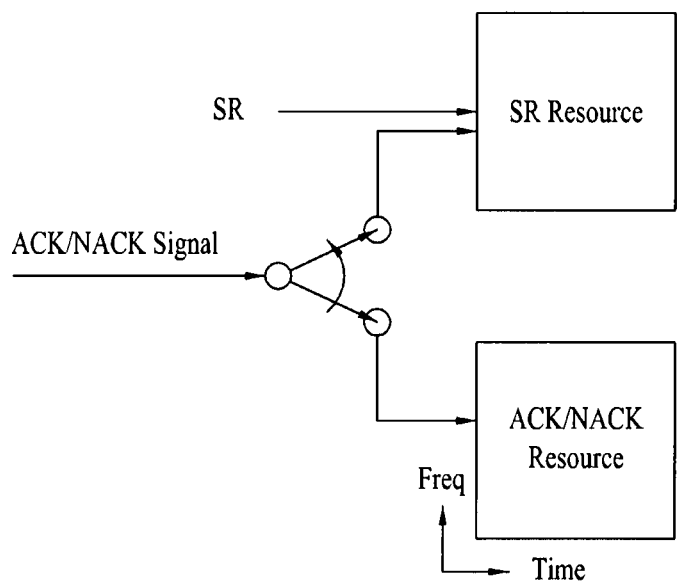
FIG. 9 is a diagram illustrating transmission of ACK/NACK information and SR.

The case where the ACK/NACK information and the SR are simultaneously transmitted will be described with reference to FIG. 9. As described above, a UE may transmit the ACK/NACK and the SR in the same subframe. For positive SR transmission, the UE transmits the ACK/NACK through resources assigned for the SR. For negative SR transmission, the UE transmits the ACK/NACK through resources assigned for the ACK/NACK.

Next, transmission resources in the PUCCH format 1/1a/1b will be described.

Transmission resources used in the PUCCH format 1/1a/1b are identified by a PUCCH resource index $n_{PUCCH}^{(1)}$. The PUCCH resource index $n_{PUCCH}^{(1)}$ is generated by an orthogonal sequence index $n_{oc}(n_s)$ and a cyclic shift $\alpha(n_s,l)$ as shown in Equation 1.

The orthogonal sequence index $n_{oc}(n_s)$ may be computed as shown in Equation 1.

$$n_{oc}(n_s) = \begin{cases} \lfloor n'(n_s) \cdot \Delta_{shift}^{PUCCH}/N' \rfloor & \text{for normal cyclic prefix} \\ 2 \cdot \lfloor n'(n_s) \cdot \Delta_{shift}^{PUCCH}/N' \rfloor & \text{for extended cyclic prefix} \end{cases}$$

Equation 1 where, $\lfloor x \rfloor$ denotes a maximum integer which is not greater than x. In addition, $n_s$ denotes a slot number within one radio frame. In addition, $\Delta_{shift}^{PUCCH}$ denotes a parameter assigned by a higher layer. $n'(n_s)$ in Equation 1 is defined as shown in Equation 2.

$$n'(n_s) =$$

Equation 2

$$n_{PUCCH}^{(1)} \quad \text{if } n_{PUCCH}^{(1)} < c \cdot \frac{N_{cs}^{(1)}}{\Delta_{shift}^{PUCCH}}$$

$$\left(n_{PUCCH}^{(1)} - c \cdot \frac{N_{cs}^{(1)}}{\Delta_{shift}^{PUCCH}}\right) \bmod \left(c \cdot \frac{N_{sc}^{RB}}{\Delta_{shift}^{PUCCH}}\right) \quad \text{otherwise}$$

for $n_s \bmod 2 = 0$ $$n'(n_s) =$$

$$[c(n'(n_s-1)+1)] \bmod \left(\frac{cN_{sc}^{RB}}{\Delta_{shift}^{PUCCH}}+1\right) - 1 \quad n_{PUCCH}^{(1)} \geq c \cdot \frac{N_{cs}^{(1)}}{\Delta_{shift}^{PUCCH}}$$

$$\lfloor h/c \rfloor + (h \bmod c)N'/\Delta_{shift}^{PUCCH} \quad \text{otherwise}$$

for $n_s \bmod 2 = 1$

A resource index to which a PUCCH is mapped within two resource blocks of two slots of one subframe may be determined by Equation 2. Here, c is 3 in the normal CP and is 2 in the extended CP. In addition, $N_{cs}^{(1)}$ denotes the number of CSs used for the PUCCH format 1/1a/1b in a resource block in which both the PUCCH formats 1/1a/1b and 2/2a/2b are used. In addition, $N_{sc}^{RB}$ denotes the size of the resource block of the frequency domain and is expressed by the number of subcarriers. h in Equation 2 is defined as $h=(n'(n_s-1)+d) \bmod (cN'/\Delta_{shift}^{PUCCH})$. Here, d is 2 in the normal CP and is 0 in the extended CP.

N' in Equation 1 is defined as shown in Equation 3.

$$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases}$$

Equation 3

In addition, the CS $\alpha(n_s,l)$ may be computed as shown in Equation 4.

$$\alpha(n_s,l) = 2\pi \cdot n_{cs}(n_s,l)/N_{sc}^{RB}$$

Equation 4 where, l denotes symbol number. $n_{cs}(n_s,l)$ in Equation 4 is defined as shown in Equation 5.

$$n_{cs}(n_s,l) = \begin{cases} \left[n_{cs}^{cell}(n_s,l) + (n'(n_s) \cdot \Delta_{shift}^{PUCCH} + (n_{oc}(n_s) \bmod \Delta_{shift}^{PUCCH})) \bmod N'\right] \bmod N_{sc}^{RB} & \text{for normal cyclic prefix} \\ [n_{cs}^{cell}(n_s,l) + (n'(n_s) \cdot \Delta_{shift}^{PUCCH} + n_{oc}(n_s)/2) \bmod N'] \bmod N_{sc}^{RB} & \text{for extended cyclic prefix} \end{cases}$$

Equation 5

$n_{cs}^{cell}(n_s,l)$ in Equation 5 is defined as shown Equation 6. All PUCCH formats use a CS of a certain sequence in each symbol. $n_{cs}^{cell}(n_s,l)$ is used to obtain CSs of different PUCCH formats. The value of $n_{cs}^{cell}(n_s,l)$ is changed according to the symbol number l and the slot number $n_s$.

$$n_{cs}^{cell}(n_s,l) = \sum_{i=0}^{7} c(8N_{symb}^{UL} \cdot n_s + 8l + i) \cdot 2^i$$

A pseudo-random sequence c(i) in Equation 6 may be defined by a gold sequence of length 31. A pseudo-random sequence generator is initiated to $c_{init}=N_{ID}^{cell}$ at the start of a radio frame. In addition, $N_{symb}^{UL}$ denotes the number of SC-FDMA symbols in an uplink slot.

The PUCCH format 2/2a/2b for transmitting channel measurement feedback CQI, PMI and RI supports modulation using a CAZAC sequence and a QPSK modulated symbol is multiplied by the CAZAC sequence having a length of 12. The CS of the sequence is changed according to a symbol and a slot. In addition, orthogonal buffering is used for the reference signal. The channel structure of the PUCCH format 2/2a/2b may be different from the channel structure of the PUCCH format 1/1a/1b. In the normal CP, the CQI information and the ACK/NACK information may be simultaneously transmitted using the PUCCH format 2a/2b. In the extended CP, the CQI information and the ACK/NACK information are simultaneously transmitted using PUCCH format 2, and the CQI information and the ACK/NACK information are jointcoded. For details of the PUCCH format 2/2a/2b, refer to the 3GPP LTE standard (e.g., TS36.211).

Relay Node (RN)

A RN may be considered for, for example, enlargement of high data rate coverage, improvement of group mobility, temporary network deployment, improvement of cell edge throughput and/or provision of network coverage to a new area.

A RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bands or uplink subframe resources are used. Here, the frequency band is resource assigned in a Frequency Division Duplex (FDD) mode and the subframe is resource assigned in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE.

For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS(Cell-specific Reference Signal) and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated form each other (for example, on the ground or under the ground) in terms of geographical positions).

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe.

SR Operation Using Shared Resource Based Filtering

Hereinafter, various embodiments of the present invention including a method of assigning resources for an SR to a UE at an eNB, a method of transmitting the SR by the UE using resources assigned from the eNB, a method of analyzing the SR transmitted from the UE at the eNB and checking for which user (UE or traffic flow) the SR is transmitted, and a method of providing the uplink transmission resources (or uplink grant) to the UE will be described.

According to the present invention, each SR may be transmitted through SR resources shared by a plurality of users (UEs or traffic flows). Each SR may be transmitted through a discriminable SR resource set. Thus, it is possible to discriminate SRs from the users using a smaller amount of radio resources as compared to a method of assigning individual SR resources to each user and to rapidly solve collision even when SRs collide with each other.

One SR resource is a combination of one or more of a time resource, frequency resource and code resource. That is, different SR resources have different resources of one or more of a time resource, frequency resource and code resource. In addition, one bit may be transmitted through one SR resource. In the following description, it is assumed that a plurality (M) of SR resources may be used and the SR resources are denoted by indexes of 1 to M.

In addition, several SR resource sets (subsets) may be configured in a set of a plurality (M) of SR resources and each of a plurality of SR resource sets may be respectively assigned (or mapped) to a plurality of UEs (or a plurality of uplink traffic flows of one or more UEs). In the following description, for convenience of description, on the assumption that one UE has one uplink traffic flow, one SR resource set is assigned (or mapped) to one UE. However, the range of the present invention is not limited thereto. In the case where one UE has a plurality of uplink traffic flows, one SR resource set may be assigned (or mapped) to the plurality of uplink traffic flows of one or more UEs.

SR Resource Assignment

First, a method of respectively assigning (or mapping) SR resources to a plurality of UEs (or a plurality of uplink traffic flows of one or more UEs) at an eNB will be described.

Shared SR resources may include a plurality (M) of SR resources (universal set) and different SR resource sets (subsets) may be respectively assigned to each SR. One SR resource set may include K (K<M) SR resources. That is, the SR resource sets may correspond to subsets having K elements of the set (universal set) including M SR resources. In addition, one SR resource set may be mapped to one UE. That is, one UE may be mapped to K resources of the M SR resources. Different UEs may be mapped to different resource set so as to be discriminated. The SR resources to which different two UEs are mapped may partially overlap each other.

Figure 10:
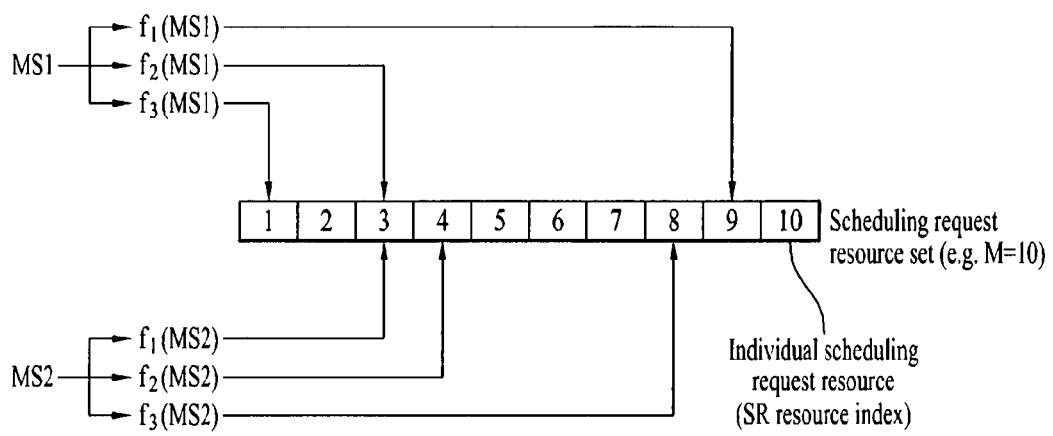
FIG. 10 is a diagram showing an example of SR resource mapping according to the present invention.

An example of SR resource mapping according to the present invention will be described with reference to FIG. 10. In the example of FIG. 10, M=10 and K=3. That is, among a total of M (=10) SR resources having SR resource indexes 1 to M (=10), one SR resource set includes K SR resources and one SR resource set may be assigned to one UE.

In the example of FIG. 10, a value of a function $f_k(x)$ has one value among $\{1, 2, \ldots, M\}$ and indicates k (k is one of $\{1, 2, \ldots, K\}$) SR resources to which one UE is mapped. The function $f_k(x)$ for mapping the UE to SR resources may be defined as a function for receiving an identifier of a UE (e.g., a MAC address or a C-RNTI of a UE) as an input value and outputting an index of an SR resource (that is, computing the position of one SR resource among M SR resources) or, for example, a hash function.

In the example of FIG. 10, an MS1 is mapped to individual SR resource indexes 1, 4 and 9 and an MS2 is mapped to individual SR resource indexes 3, 4 and 8. Although not shown in FIG. 10, different SR resource sets may be assigned to different MSs.

As described above, in the present invention, portions (for example, an SR resource index 4) of SR resources assigned to two different MSs may overlap each other. Thus, the number of MSs to which discriminable SR resource sets may be assigned while sharing M SR resources may be greater than M. Accordingly, it is possible to remarkably reduce the total amount of SR resources while assigning discriminable SR resources as compared to a method of assigning a dedicated channel for SR transmission to each MS.

More specifically, in the case of determining a plurality of SR resource sets from among M SR resources, it is assumed that one SR resource set may include K SR resources. In this case, N different SR resource sets may be configured. Here, $N = {}_MC_K = M!/K!*(M-K)!$ and "${}_MC_K$" indicates the number of cases of selecting K SR resources from M SR resources regardless of the order of SR resources, "!" indicates factorial, and $x! = 1*2*3* \ldots *(x-1)*x$. As in the above-described example, in the case where M (=10) SR resources are shared and one SR resource set includes K (=3) SR resources, a total of N (=120) different SR resource sets may be configured. Thus, it is possible to assign discriminable SR transmission resources to a maximum of N (=120) different MSs in a manner of assigning K (=3) SR resources to one MS among M (=10) SR resources.

Next, an eNB may notify each MS of SR resource sets (indexes of individual SR resources or positions of SR resources) assigned (or mapped) to each MS.

An MS which receives an indication for SR resource assignment from an eNB may transmit a signal through SR resources, to which the MS is mapped, when transmitting an SR. An MS which does not transmit an SR does not transmit a signal through assigned SR resources. In the example of FIG. 10, the MS1 may transmit a signal through the SR resources 1, 4 and 9 when transmitting an SR and the MS2 may transmit a signal through the SR resources 3, 4 and 8 when transmitting an SR.

Detection (Filtering) of SR

In order to detect an uplink SR, an eNB may determine whether or not a signal is transmitted through each SR resource. For example, if two or more MSs transmit SRs, two or more signals may be transmitted through one SR resource (e.g., an SR resource index 4 in the example of FIG. 10) to which two or more MSs are mapped. However, the eNB determines only whether or not the signal is transmitted through a certain SR resource. For example, the eNB may determine that the signal is transmitted through the SR resource if power or energy of the signal received (or detected) through the SR resource is equal to or greater than (or greater than) a predetermined reference value and determine that the signal is not transmitted through the SR resource if the power or energy of the received signal is less than (or equal to or less than) the predetermined reference value. Accordingly, the eNB determines only whether or not the signal is transmitted through the certain SR resource, regardless of how many signals are transmitted through the certain SR resource.

The eNB may set each of the plurality (M) of SR resources to 1 (or a first logic value) if the signal is transmitted through the SR resource and sets each of the plurality of SR resources to 0 (or a second logic value) if the signal is not transmitted through the SR resource, thereby generating a bit sequence having a length of M bits. For example, if other MSs which are not shown in the example of FIG. 10 do not transmit SRs and the MS1 and the MS2 transmits SRs (that is, the MS1 and the MS2 transmits signals using the respectively assigned SR resource sets), the bit sequence having the length of M (=10) bits generated by the eNB according to the signals detected from the plurality (M) SR resources is "1011000110".

The eNB may determine which MS transmits the SR based on the generated bit sequence. That is, if all bits corresponding to K SR resources assigned (or mapped) to a specific MS are 1 (or the first logic value), the eNB may determine that the specific MS transmits the SR. In other words, if the SR resources, which are determined to be used to transmit the signal, of the M SR resources include all the SR resources assigned to the specific MS, it may be determined that the specific MS transmits the SR. Such an operation may be expressed by filtering the SR of the specific MS from the signal received by the eNB through the shared SR resources. The SR transmission operation of the MS and the SR detection (or filtering) of the eNB proposed by the present invention may be expressed, for example, as a method using a bloom filter structure.

For example, if the SR resource indexes 1, 4 and 9 are assigned to the MS1 in the example of FIG. 10 and the bit sequence "1011000110" is generated by detection of the signal through the M (=10) SR transmission resources, since all the bit values corresponding to the SR resource indexes 1, 4 and 9 are 1, the eNB may determine that the MS1 transmits the SR.

If the SR resource indexes 1, 7 and 10 are assigned to an MS3 (not shown) in the M (=10) SR transmission resources in the example of FIG. 10 and the bit sequence "1011000110" is generated by detection of the signal through the M (=10) SR transmission resources, since the bit value 1 corresponding to the SR resource index 1 is 1 but the bit values corresponding to the SR resource indexes 7 and 10 are 0, the eNB may determine that the MS3 does not transmit the SR.

In SR resource assignment according to the above-described shared SR resource based filtering method, false positives may be detected. That is, even when a certain MS does not actually transmit an SR, an eNB may determine that the MS transmits the SR. This may occur when a plurality of different MSs transmits SRs through SR resources respectively assigned to the MSs and SR resources assigned to a certain MS is included in a sum of sets of SR resources assigned to the plurality of different MSs. In the SR method using the shared SR resource based filtering method of the present invention, if an error does not occur when the eNB detects a signal on the SR resource, the case where the MS actually transmits the SR but the eNB does not detect the SR of the MS, that is, false negatives does not substantially occur.

For example, if the SR resource indexes 3, 4 and 8 are assigned to an MS4 (not shown) in the M (=10) SR transmission resources in the example of FIG. 10 and a bit sequence "1011000110" is generated according to detection of the signal on the M (=10) SR transmission resources (that is, according to the SRs of the MS1 and the MS2), since all the bit values corresponding to the SR resource indexes 3, 4 and 8 are 1, the eNB may determine that the MS4 transmits the SR. In this case, since the eNB assigns uplink transmission resources to the MS which does not transmit the SR, there is a possibility of resource waste. In contrast, in "Space/time trade-offs in hash coding with allowable errors," Bloom, Burton H. (1970), Communications of the ACM 13(7): 422-426, it is possible to restrict a probability that false positives occur to an allowable degree, by adequately adjusting the size M of the universal set of SR resources and the number K of SR resources assigned (or mapped) to one MS. For example, if the number of users (MSs or traffic flows) to which SR resources must be assigned is large, it is possible to increase orthogonality of SR resource sets assigned to different users by increasing the M value or decreasing the K value. In addition, even when uplink transmission resources are scheduled to the MS (e.g., the MS4) without data to be transmitted in uplink, the MS only does not perform uplink transmission. Although uplink transmission resources are not scheduled to an MS which transmits an SR, system performance is only slightly deteriorated. This is because a probability that the MS which transmits the SR transmits an SR once more at next timing and receives uplink transmission resources is high. Accordingly, in view of system performance, according to the present invention, although uplink transmission resources may be wasted due to false positives, it is possible to remarkably reduce the amount of SR resources required by the overall system by assigning (or mapping) portions of the universal set of SR resources (that is, M SR resources) shared between the plurality of MSs to the plurality of MSs.

SR of Each Traffic Flow

Although the case where a plurality of MSs transmits SRs to an eNB is described in the examples of the present invention, the scope of the present invention is not limited thereto. The SR method using the shared SR resource based filtering method of the present invention is applicable to the other cases. For example, the present invention is applicable to the case where one MS has two or more uplink traffic flows such that the MS may independently transmit the SR of each uplink traffic flow. In this case, the same principle as the case where each MS transmits one SR described in the above example of the present invention is applicable to the case where each uplink traffic flow transmits an SR. That is, an entity to which an SR resource set is assigned or which transmits an SR may be changed from one MS to one traffic flow. In some cases, one MS may transmit two or more discriminable SRs.

Figure 11:
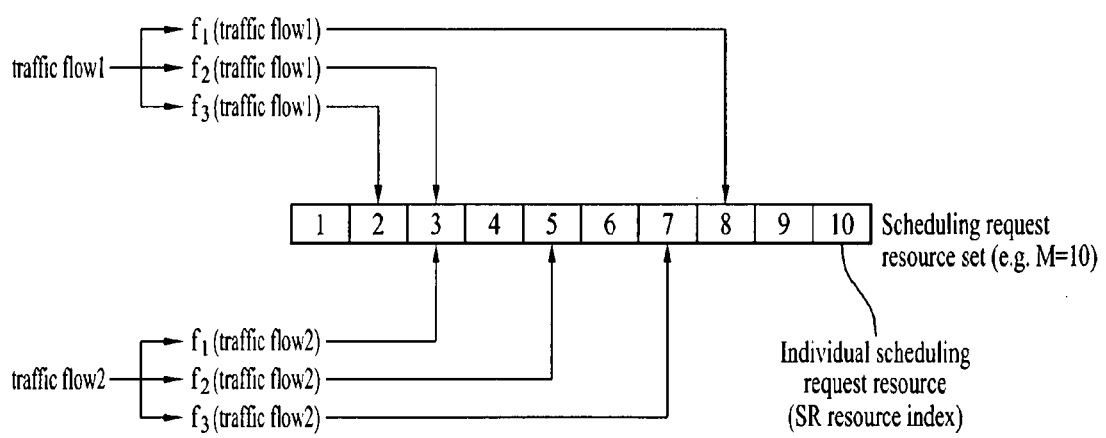
FIG. 11 is a diagram showing another example of SR resource mapping according to the present invention.

In the example of FIG. 11, an SR resource set is assigned to each of two uplink traffic flows. The two traffic flows (traffic flows 1 and 2) of FIG. 11 may be different uplink traffic flows of one MS or uplink traffic flows of different MSs. In FIG. 11, SR resource indexes 2, 3 and 8 are assigned to the traffic flow 1 and SR resource indexes 3, 5 and 7 are assigned to the traffic flow 2. The SR of the traffic flow may be transmitted through the SR resource set assigned to each traffic flow. For example, it is assumed that the eNB detects signal transmission through the SR resources corresponding to the SR resource indexes 1, 2, 3, 6 and 8 among M (=10) SR resources and a bit sequence generated by the signal detection is "1110010100". In this case, since all the bit values corresponding to the SR resource indexes 2, 3 and 8 assigned to the traffic flow 1 are 1 (or the first logic value), the eNB may determine that the SR of the traffic flow 1 is transmitted and may transmit uplink scheduling control information. In contrast, since the bit value corresponding to the SR resource index 3 among the SR resource indexes 3, 5 and 7 assigned to the traffic flow 2 is 1 (first logic value) but the bit values corresponding to the SR resource indexes 5 and 7 are 0 (second logic value), the eNB may determine that the SR of the traffic flow 2 is not transmitted. In the above example, the signal transmission detected by the eNB in the SR resource indexes 1 and 6 may be performed by an SR of another traffic flow (not shown).

The embodiment of the present invention, in which the SR resource set is assigned to each traffic flow and the SR is transmitted through the assigned SR resource set, may be particularly efficient when Quality of Service (QoS) requirements or scheduling priorities of traffic flows are differently set.

SR Operation Using Shared Resource Based Filtering Method through Relay

Hereinafter, embodiments in which the SR operation using the shared SR resource based filtering method described in the above embodiments of the present invention is applied to a system using a relay will be described. The above-described principle of the present invention is applicable to the case where an eNB (or a relay) is connected to several MSs and aggregates SRs from the several MSs connected to the eNB (or the relay) (that is, served by the eNB (or the relay)) or SRs of several uplink traffic flows which may be received by the eNB (or the relay)) and the case of forwarding the aggregated SRs.

Figure 12:
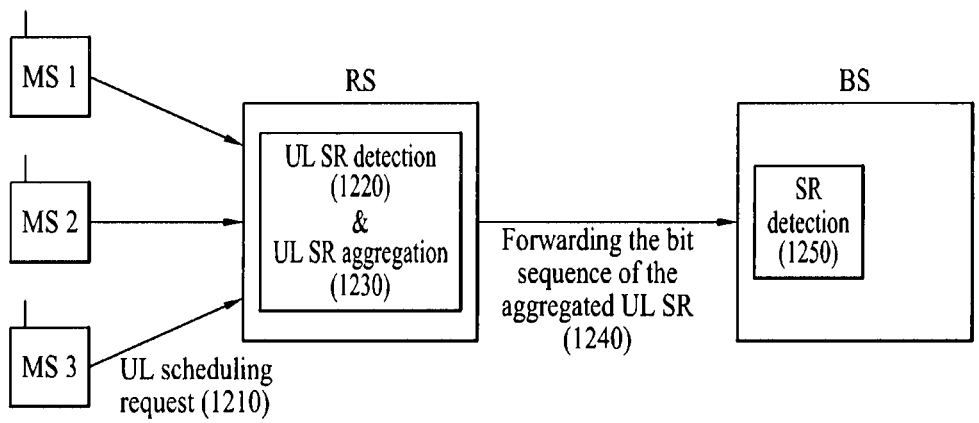
FIG. 12 is a diagram illustrating an operation of a relay for forwarding an uplink scheduling request to an eNB.

The operation of the relay which aggregates and forwards the uplink SRs of MSs to a base station (BS) will be described with reference to FIG. 12.

As described above, a relay (RS) may serve to forward transmission and reception between a BS and MS1, MS2 and MS3. For example, the MS1, MS2 and MS3 connected to one RS may transmit SRs to the RS (1210). A random access method or a dedicated channel method of the related art or the above-described shared SR resource based filtering method of the present invention may be used to transmit the SRs from the MS1, MS2 and MS3 to the RS. Then, the RS may determine which MS transmits an SR using a method similar to the related art or using the same method as the operation of the BS for detecting (or filtering) the SR on the shared SR resources of the present invention (1220). In other words, any method may be used to transmit the SR(s) from the MS(s) to the RS and the RS may determine whether which MS(s) transmits the SR(s) using any method.

If the RS determines which MS(s) transmits the SR(s) (1220), the RS aggregates and forwards the results to the BS (1240). The shared SR resource based filtering method of the present invention is applicable to the case where the RS aggregates and forwards the SRs of several MSs to the BS.

More specifically, the RS may determine whether the MS1, MS2 and MS3 transmit respective SRs and generate a bit sequence used in the shared resource based filtering method using the determined result. For example, the RS maps different SR resource sets of M shared SR resources depending on whether the MS1, MS2 and MS3 transmit the respective SRs, sets the bit value of a certain SR resource position to 1 (or the first logic value) if one or more MS(s) mapped to the SR resources transmit SRs and to 0 (or the second logic value) if all the MS(s) mapped to the SR resources do not transmit the respective SRs, and generates a bit sequence having a length of M bits.

Since the RS aggregates only the result of detecting the SRs from the MS1, MS2 and MS3 and generates the bit sequence having the length of M bits, the MS1, the MS2 and the MS3 do not need to transmit the respective SRs to the RS using the shared SR resource based filtering method. Regardless of the method of transmitting the SRs, the RS can generate a bit sequence obtained by aggregating the respective SRs from the MS1, the MS2 and the MS3 using the above method. For example, if the MS1 transmits the SR using the random access method or the dedicated channel method of the related art and SR resource sets of the M shared SR resources are not assigned to the MS1 but the RS detects the SR from the MS1, it is assumed that the resources of a specific position among the M shared resources are assigned to the MS1. Thus, the RS may generate the bit sequence having the length of Mbits using the above method, depending only upon whether or not the SR transmitted from each MS is detected.

The RS may forward the bit sequence obtained by aggregating the SRs from the MS1, the MS2 and the MS3 (generated depending upon whether the SR transmitted from each MS is detected) to the BS (1240). The BS may detect which MS transmits the SR from the bit sequence received from the RS using the method similar to the above method. For example, if the bit sequence transmitted from the RS to the BS is "1011000110", the SR resource positions assigned (or assumed to be assigned) to the MS1 are 1, 4 and 9 and the SR resource positions assigned (assumed to be assigned) to the MS3 are 1, 7 10, the BS may detect that the MS1 transmits the SR and the MS3 does not transmit the SR. Thus, the BS can provide uplink scheduling control information to the MS1.

Using the above method, it is possible to reduce the amount of resources used when the RS forwards the SRs from the MS1, MS2 and MS3 to the BS.

Figure 13:
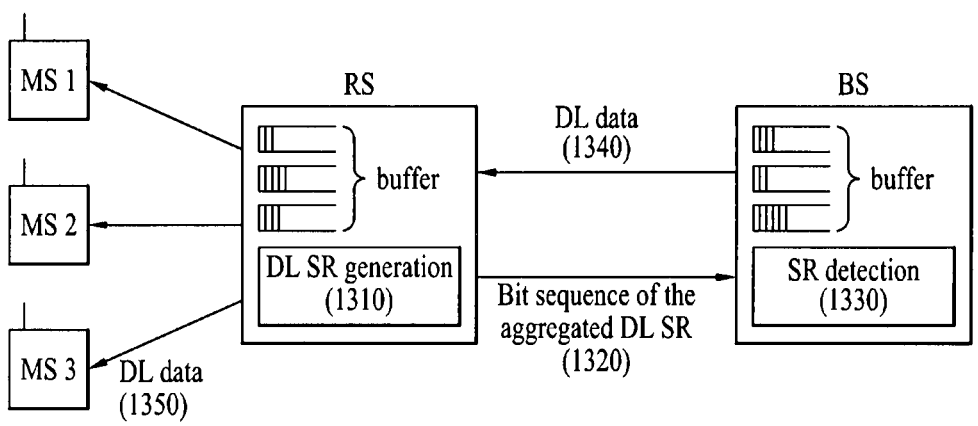
FIG. 13 is a diagram illustrating an operation of a relay for transmitting a scheduling request for downlink transmission to an eNB.

The operation of the RS which transmits an SR for downlink transmission to the MS to the BS will be described with reference to FIG. 13.

As described above, the RS may serve to forward transmission and reception between the BS and the MS1, the MS2 and the MS3. For example, a downlink traffic flow from the BS may be transmitted to the MS1, the MS2 and the MS3 through the RS. The RS may make a request for downlink scheduling for a downlink traffic flow passing therethrough to the BS. The method of transmitting the SR using the shared SR resource based filtering method according to the present invention is applicable to the case where the RS transmits a downlink scheduling request to the BS.

More specifically, the RS may determine downlink traffic flow(s) or MS(s) which will receive downlink data from the BS, based on a buffer state and/or a channel state of each downlink traffic flow or MS. For example, traffic flow(s) or MS(s) having a good channel state and/or in which the amount of data stored in the buffer of the RS is low may be selected as a downlink data transmission destination. The RS may make a request to the BS for transmitting downlink data which will be transmitted from the RS to the selected traffic flow(s) or MS(s) from the BS to the RS. The SR method using the shared SR resource based filtering method of the present invention is applicable to the case where the RS requests downlink data transmission to the BS.

The RS may determine whether or not downlink scheduling for each of several MSs (the MS1, the MS2 and the MS3) or each traffic flow is necessary and generate a downlink scheduling request with respect to each traffic flow or each MS. Then, the RS may aggregate SR(s) of the traffic flow(s) or MS(s) as a downlink transmission destination and generate a bit sequence (1310).

For example, it may be assumed that different SR resource sets of the M shared SR resources may be assigned to a downlink SR of each MS. Although the SR resource sets are not actually assigned to each MS, it may be assumed that the bit sequence having the length of M bits generated by the RS are mapped to the M SR resources. Based on this assumption, in order to make a request to the BS for scheduling downlink data transmission to the MS(s), the RS may aggregate SRs of the MSs and generate a bit sequence having a length of M bits (1310). For example, if the RS makes a request to the BS for scheduling downlink transmission to the MS1 and the MS2, the RS may set the bit values of the positions (e.g., 1, 4 and 9) of the SR resources assigned to the MS1 and the positions corresponding to the SR resource sets (e.g., 3, 4 and 8) assigned to the MS2 among the M SR resources to 1 (or the first logic value) and set the bits of the remaining positions to 0 (or the second logic value). The bit sequence having the length of M bits may be, for example, "1011000110".

The RS may transmit the generated bit sequence to the BS (1320). The BS which receives the bit sequence from the RS may detect for which MS a downlink SR is transmitted using the above-described method (1330).

For example, if the bit sequence transmitted from the RS to the BS is "1011000110", the SR resource positions assigned (or assumed to be assigned) to the downlink SR for the MS1 are 1, 4 and 9 and the SR resource positions assigned (assumed to be assigned) to the downlink SR for the MS3 are 1, 7 and 10, the BS may detect that the downlink SRs for the MS1 and the MS2 are transmitted and the downlink SR for the MS3 is not transmitted.

Thus, the BS may transmit the downlink data for the MS1 and the MS2 to the RS (1340) and the RS which receives the downlink data may forward the downlink data to the MS1 and the MS2 (1350).

Using the above method, it is possible to reduce the amount of resources used when the RS transmits the downlink SRs for the MS1, the MS2 and the MS 3 to the BS.

Shared SR Resources

In the various examples of the present invention, the method of detecting (filtering) which user (MS or traffic flow) transmits an SR by mapping (assigning) different SR resource sets among the shared SR resources (e.g., M discriminable SR resources) to the users (MSs or traffic flows) is described.

Fundamentally, the shared SR resources include a set of discriminable resources. That is, the individual SR resources may have orthogonality. Here, the individual SR resources may be set as discriminable (orthogonal) time resources, frequency resources and/or code resources. For example, the universal set of M orthogonal individual SR resources configures shared SR resources and a plurality of subsets (that is, SR resource sets) including a specific number of individual SR resources of the shared SR resources exists. One SR resource set may be mapped to one user (MS or traffic flow). A portion of the orthogonal individual SR resources belonging to one SR resource set may overlap a portion of the orthogonal individual SR resources belonging to another SR resource set. That is, it is possible to assign discriminable SR resources (that is, SR resource sets) to users while a plurality of users shares individual SR resources. Thus, it is possible to transmit the SRs of the users using discriminable SR resources while sharing the SR resources.

Hereinafter, the detailed examples of the method of enabling a plurality of users (MSs or traffic flows) to share a plurality of SR resources using the SR method of the present invention will be described.

Method Based on Symbol Unit Operation

In a 3GPP LTE system, PUCCH resources may be implicitly determined by association with PUCCH resource indexes and the resource positions of the downlink scheduling commands as described with reference to Equations 1 to 6. For example, PUCCH resource indexes (PUCCH resource index values obtained by coupling of an orthogonal sequence (OC) and a cyclic shift (CS)) used for PUCCH transmission are changed every symbol in order to minimize deterioration in PUCCH performance due to resource collision between cells. A factor for generating a change in index between symbols is a CS within every slot and a factor for generating a change in index between slots is a CS and an OC. The OC index is expressed as $n_{oc}(n_s)$ of Equation 1 and the CS index is expressed as $n_{cs}(n_s,l)$ of Equation 5. In particular, the CS index $n_{cs}(n_s,l)$ is changed every symbol by the component $n_{cs}^{cell}(n_s,l)$ (Equations 5 and 6). A pattern in which the PUCCH resource index is changed every symbol may be called a symbol unit hopping pattern.

According to one embodiment of the present invention, the obtained symbol unit hopping pattern is mapped to a bit sequence having a specific length so as to be used as the SR resources described in the above-described examples of the present invention. For example, the length of the symbol unit hopping pattern may be set to 14 which is the number of OFDM symbols of one subframe in the case of the normal CP and each bit sequence mapped to each symbol unit hopping pattern may have a length of 14 bits. Each bit sequence may indicate resources used for SR transmission of each user.

For example, a symbol unit hopping pattern A may be mapped to a bit sequence a and a symbol unit hopping pattern B may be mapped to a bit sequence b. The bit sequence a may indicate SR transmission resources for the user 1 and the bit sequence b may indicate SR transmission resources for the user 2. For example, the bit sequence a may be "11000001100000" and the bit sequence b may be "01010000010100". In this case, in a set including 14 SR resources, SR resources of first, second, eighth and ninth symbols are assigned to the user 1 and SR resources of second, fourth, tenth and twelfth symbols may be assigned to the user 2. Here, although the SR resources for the user 1 and the SR resources for the user 2 partially overlap each other (SR resources of the second symbol), the user 1 and the user 2 are mapped to discriminable SR transmission resource sets.

One or more SR transmission resources are mapped to one symbol unit hopping pattern in one-to-one correspondence (that is, an SR resource set including one or more (in the above-described embodiment, K) SR resources is assigned to one user) and an SR of each user may be transmitted using one or more SR resources.

An SR of one user using one or more SR resources may be transmitted through one symbol of an uplink subframe. In consideration of the case where uplink transmit power is restricted, the SR of one user is preferably transmitted over a plurality of symbols. In order to determine a symbol which will be used to transmit the SR, the use of a bit sequence indicating the SR resources may be considered. For example, it may be assumed that the hopping pattern A is mapped to the bit sequence a and the bit sequence a indicating the resources for transmitting the SR of the user 1 is "11000001100000". In this case, the SR of the user 1 may be transmitted through the first and second symbols of the first slot and the first and second symbols of the second slot of one uplink subframe. In addition, it may be assumed that the hopping pattern B is mapped to the bit sequence b and the bit sequence b indicating the resources for transmitting the SR of the user 2 is "01010000010100". In this case, the SR of user 2 may be transmitted through the second and fourth symbols of the first slot and the third and sixth symbols of the second slot of one uplink subframe. If transmit power per subframe is insufficient when transmitting the SR in this way, a power boosting method may be applied.

As one method of solving a transmit power problem, a method of generating a new SR hopping pattern using the existing PUCCH hopping pattern and using the new SR hopping pattern as SR resources may be considered. The method of generating the new SR hopping pattern may be generally applied to the case where the number of SR resources (the number of sequence resources or code resources) applied to the method of the present invention is less than the number of sequence resources used for the existing PUCCH transmission but is not limited thereto. A plurality of users (MSs or traffic flows) can share the SR resources corresponding to the new SR hopping patterns (that is, hopping patterns less in number than the number of existing PUCCH hopping patterns). For example, in order to support transmission of the SRs from the M users, it is possible to generate M SR hopping patterns. One SR hopping pattern is assigned to one user and each of the M users may transmit the SR using different types of code resources (sequences to which different OCs and/or CSs are applied) over 14 symbols (in the case of the normal CP). Accordingly, a plurality of users can share restricted SR resources while performing hopping between cells for SR transmission.

In the above description, the method of generating the new bit sequence based on the existing symbol unit hopping pattern and using the new bit sequence as the SR resources of the present invention is described. However, the present invention is not limited thereto and sequence resources (that is, code resources) discriminable using various methods may be used as the SR resources used for the SR method using the shared SR resource based filtering method. That is, the SR resources do not need to be configured based on the existing hopping pattern. For example, a new hopping pattern (e.g., a hopping pattern generated based on one subframe having a length of 14 in the normal CP) may be generated according to the number of assigned SR resources and used as SR resources. In addition, the present invention is not limited to the symbol unit hopping pattern. For example, a hopping pattern of a plurality (N) of symbol units may be used as SR resources.

Method Based on Slot Unit Operation

As described with reference to FIGS. 6 and 8, since an SR channel reuses the ACK/NACK channel structure (FIG. 6) of the PUCCH format 1a/1b and the reference signal is not transmitted through the SR channel, in the case of the normal CP, a sequence having a length of 7 may be used in one slot. The sequence for SR having a length of 7 may be divided into two sequences (a sequence 1 having a length of and a sequence 2 having a length of 4) (FIG. 8(*a*)). Although the reference signal is not transmitted through the SR channel, it is assumed that the sequence 1 corresponds to the reference signal portion of the ACK/NACK channel and the sequence 2 corresponds to the payload portion of the ACK/NACK channel.

According to one embodiment of the present invention, the OC applied to the sequence 1 and the sequence of the SR channel may be used as the SR resources. In other words, it is possible to discriminate users (MSs or traffic flows) for transmitting the SRs, depending on which OC is used in each of the sequence 1 (the length of 3 and the reference signal portion) and the sequence 2 (the length of 4 and the payload portion) of each slot in the SR channel.

FIG. 8 shows the structure of the SR channel on one slot. Since two OCs are applied to one slot, four OCs are used in one subframe. In the normal CP or the extended CP, the lengths of the OCs may be differently set. For example, in the normal CP, a spreading factor (SF) corresponding to the length of the OC may be 3 or 4.

Which OC is used in each of four discriminable OCs applied to one subframe may be expressed as OC indexes #0, #1 and #2 shown in Tables 1 to 3. For example, if [+1 +1 +1 +1] is used as the sequence 2 having the length of 4, it is expressed as the sequence index #1.

According to one embodiment of the present invention, it is possible to discriminate the SR transmission of each user by applying a combination of sequence indexes #0, #1 and #2 used in each of the four OCs of one subframe to one or more SR resources mapped to each user (MS or traffic flow).

For example, one or more SR resources may be mapped to a certain user, four OCs may be applied to the one or more SR resources and one sequence index (one of #0, #1 and #2) may be applied to each OC. For example, it is assumed that four OCs used in one subframe include OC1 (the payload portion of the first slot), OC2 (the reference signal portion of the first slot), OC3 (the payload portion of the second slot) and OC4 (the reference signal portion of the second slot). In this case, if the sequence index #0 is used with respect to OC1, the sequence index #0 is used with respect to OC2, the sequence index #1 is used with respect to OC3 and the sequence #0 is used with respect to OC4, a combination of the sequence indexes used in the four OCs (OC1, OC2, OC3 and OC4) of one subframe may be expressed as (#0, #0, #1 and #0). It is possible to discriminate the SRs of the users by mapping the combination of the discriminable sequence indexes to the SR resources. For example, one or more SR resources mapped to each user are discriminated in a manner of mapping (#2, #1, #0, #0) to the SR sequence 1 and mapping (#1, #1, #2, #0) to the SR sequence 2 as the combination of sequence indexes. The SR transmission of the user may be discriminated by mapping different combinations of SR resources to the users.

In addition, in consideration that the CS is changed according to the symbol in the SR channel structure, different CSs are applied to the same OC pattern so as to generate a wider variety of patterns (that is, individual SR resources). In the above description, for convenience, one CS is applied to a plurality of OCs.

Figure 14:
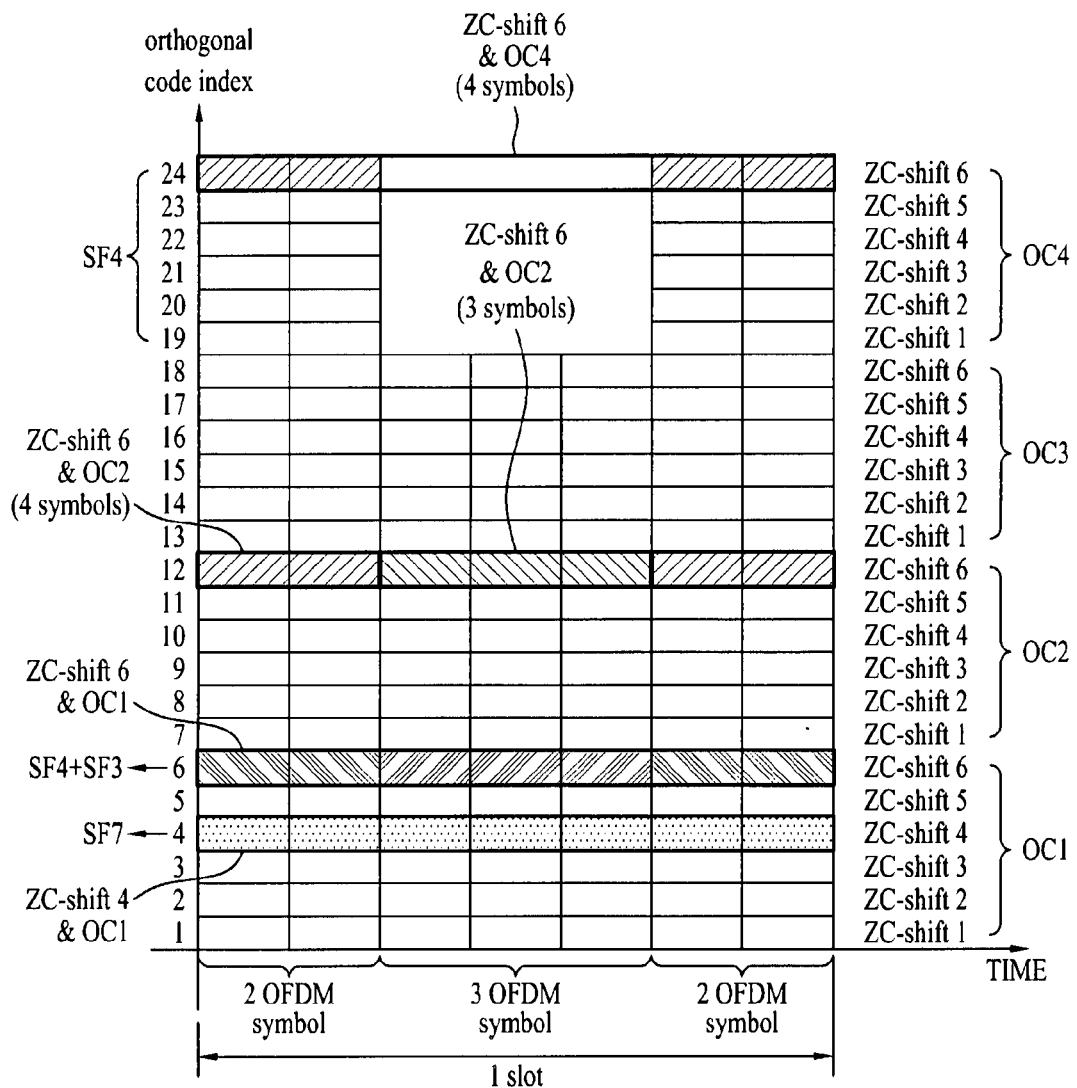
FIG. 14 is a diagram showing an example of an SR sequence resource configuration in one slot in a normal Cyclic Prefix (CP).

FIG. 14 is a diagram showing an example of an SR sequence resource configuration in one slot in a normal CP. In FIG. 14, the horizontal axis denotes an OFDM symbol in a time domain and the vertical axis denotes an orthogonal code index. As a basic sequence of an SR sequence, a Zadoff-Chu (ZC) sequence is used. The orthogonal code index is expressed as a total of 24 indexes by applying 6 ZC-shift 1 to ZC-shift 6 to each of four orthogonal covering sequences OC1, OC2, OC3 and OC4. In addition, in the configuration of the SR sequence, an SF may include a spreading factor SF4 having a length of 4, a spreading factor SF3 having a length of 3 and a spreading factor SF7 having a length of 7, and a spreading factor having a length 7 may include a combination SF4+SF3 of spreading factors having a length of 3 and a length of 4.

In FIG. 14, ZC-shift 4 is applied to OC1 and the spreading factor SF7 having the length of 7 is applied as an example of the SR sequence, and ZC-shift 6 is applied to OC1 and the spreading factor SF4+SF3 of the combination of the length of 4 and the length of 3 is applied as another example of the SR sequence. FIG. 14 shows the example in which ZC-shift 6 is applied to OC2 and the spreading factor SF4 having the length of 4 is applied and the example in which ZC-shift 6 is applied to OC2 and the spreading factor SF3 having the length of 3 is applied. FIG. 14 shows the example in which ZC-shift 6 is applied to OC4 and the spreading factor SF4 having the length of 4 is applied.

In FIG. 14, a slot unit sequence pattern may be generated using an orthogonal sequence which is not used in a PUCCH payload portion (OFDM symbol indexes #0, #1, #5 and #6 of the first slot of one subframe). As shown in Table 1, three sequences [+1 +1 +1 +1], [+1 −1 +1 −1] and [+1 −1 −1 +1] are used in the existing PUCCH payload portion as the OC having the length of 4. For example, a slot unit sequence pattern may be generated using a sequence [−1 −1 +1 +1] which is not used in the existing PUCCH payload portion and is orthogonal to the above-described sequences. If SR resources are configured using the generated orthogonal sequence, it is possible to reduce collision with the existing PUCCH payload portion.

A portion of four OCs (OC1 (the payload portion of the first slot), OC2 (the reference signal portion of the first slot), OC3 (the payload portion of the second slot) and OC4 (the reference signal portion of the second slot)) of one subframe is selected and transmitted so as to be applied to the above-described SR method using the shared SR resource based filtering method. For example, if two of four OCs are selected, a method of selecting one OC from the first slot and one OC from the second slot, a method of selecting two OCs from only the first slot, and a method of selecting two OC from only the second slot may be considered. When only some OCs of one subframe are transmitted, transmit power is reduced. Thus, a power control (power boosting) method for solving this problem may be applied.

Method Based on Subframe Unit Operation

According to one embodiment of the present invention, for SRs of a plurality of users (MSs or traffic flows), a plurality of subframes may be used as shared SR resources to which the shared SR resource based filtering method is applied.

For example, K (K<M) subframes are selected from M subframes so as to transmit SRs, thereby discriminating the SRs of N users. For example, among 10 subframes, a user 1 may transmit the SR in first, fourth and ninth subframes and a user 2 may transmit the SR in third, fourth and eighth subframes. The BS which receives the SR detects in which subframe the SR is included so as to determine which user transmits the SR.

Method Based on Multi-Sequence

As described above, in the methods of configuring the SR resources in symbol units, slots units or subframe units, it is assumed that one code (sequence) is transmitted at one time point. According to an example of the present invention, multi-sequence transmission is used at one time point so as to configure more SR transmission patterns. That is, it is possible to discriminate SR resources using a plurality of code resources even on one time resource. Thus, since discriminable code resources (or sequence resources) are considered, a code (or sequence) dimension is added.

Multi-sequence transmission is additionally or independently applicable to the configuration of the SR resources using the time resources. If multi-sequence transmission is applied, more users may share less time resources as compared to single sequence transmission. For example, the transmission pattern of the symbol unit, slot unit and subframe unit may be applied as a method of transmitting each of multiple sequences. Additionally, patterns discriminable in a sequence domain may be specified. Alternatively, SR resources may be configured using only sequence resources. For example, if 10 sequences are used, the SR method using the shared SR resource based filtering method may be configured in a manner of assigning first, fourth and ninth sequences to the user 1 and assigning third, fourth and eighth sequences to the user 2.

According to the SR method using the shared SR resource based filtering method of the present invention, for example, a discriminable SR resource set (including K individual SR resources) is mapped to each user while a plurality of users (MSs or traffic flows) shares a plurality (M) of SR resources and a BS which receives the SRs from one or more users may determine which user transmits an SR. In the above-described SR resource configuration method, time resources (the symbol unit pattern, the slot unit pattern, the subframe unit pattern) and/or code resources (based on multi-sequence) are used. Additionally or separately, as described above, frequency resources may be used as the SR resource configuration method according to the example of the present invention. For example, such a method is applicable to a system in which a frequency position (a subcarrier, a physical resource block or a cluster) is not fixed to a specific position. For example, individual SR resources, which are discriminable by frequency positions (subcarriers, physical resource blocks or clusters) discriminable even when the same code resources (SR sequence) are used on the same time resource (subframe, slot or symbol), may be set. For example, frequency resources may be used as SR resources in a manner of mapping the user 1 to a first set of K individual frequency resources among a plurality (M) of frequency resources and mapping the user 2 to a second set of K individual frequency resources. As described above, one of time resources, code resources and frequency resources or a combination of two or more resources may be used as SR resources so as to configure shared SR resources.

In the above-described various examples of the present invention, with respect to SRs of a plurality of users (MSs or traffic flows), a set of discriminable SR resources is mapped (or assigned) to each user on the shared SR resources including a plurality of SR resources so as to detect the SR of each user using the filtering method. Thus, it is possible to support SRs of users greater in number (N) than the number (M) (e.g., in the case where K SR resources are mapped to each user, $N={}_MC_K$) of SR resources configuring the shared SR resources. As compared to the SR method of assigning a dedicated channel to each user (M users can be supported using M SR resources), it is possible to support more users using the same SR resources. In addition, as compared to the method of transmitting the SR of each user using a random access method, it is possible to reduce time delay from a time when each user transmits the SR to a time when scheduling is performed.

A method of transmitting and receiving an SR according to a preferred embodiment of the present invention will be described with reference to FIG. 15.

In step S1510, a BS may assign one or more users to each of one or more subsets of SR resources in a set of M SR resources. In step S1520, such assigning information may be transmitted to one or more MSs. Then, each MS can determine SR resources (that is, subsets of SR resources) to be used.

In step S1530, the MS may transmit an SR on SR resources of the assigned subsets of SR resources. At this time, the SR from another MS may be transmitted to the BS on the SR resources of the subsets of the SR resources assigned to the MS. One MS may transmit SRs for traffic flows to the BS on the SR resources of the subsets of the SR resources assigned to one or more traffic flows.

In step S1540, the BS may determine SR resources used for the SR among the M SR resources. The BS may determine the SR resources used for the SR depending on whether or not a signal is transmitted on each of M SR resources.

In step S1550, the BS may determine a user (a MS or a traffic flow) associated with the received SR. That is, the BS may determine the user of which the SR is received. The BS may determine (filter) the user of which the SR is received, based on the SR resources which are determined to be used for the SR in step S1540 and the SR resources of the subsets of the SR resources assigned to each user in step S1510. For example, in the case where the SR resources which are determined to be used for the SR in step S1540 include all SR resources configuring one subset of SR resources assigned to one user in step S1510, it may be determined that the SR of the user is received.

In step S1560, the BS may transmit scheduling control information (e.g., uplink grant) to the user(s) which are determined to transmit the SR(s) in step S1550. Each user may transmit uplink data based on the scheduling control information (not shown).

Figure 15:
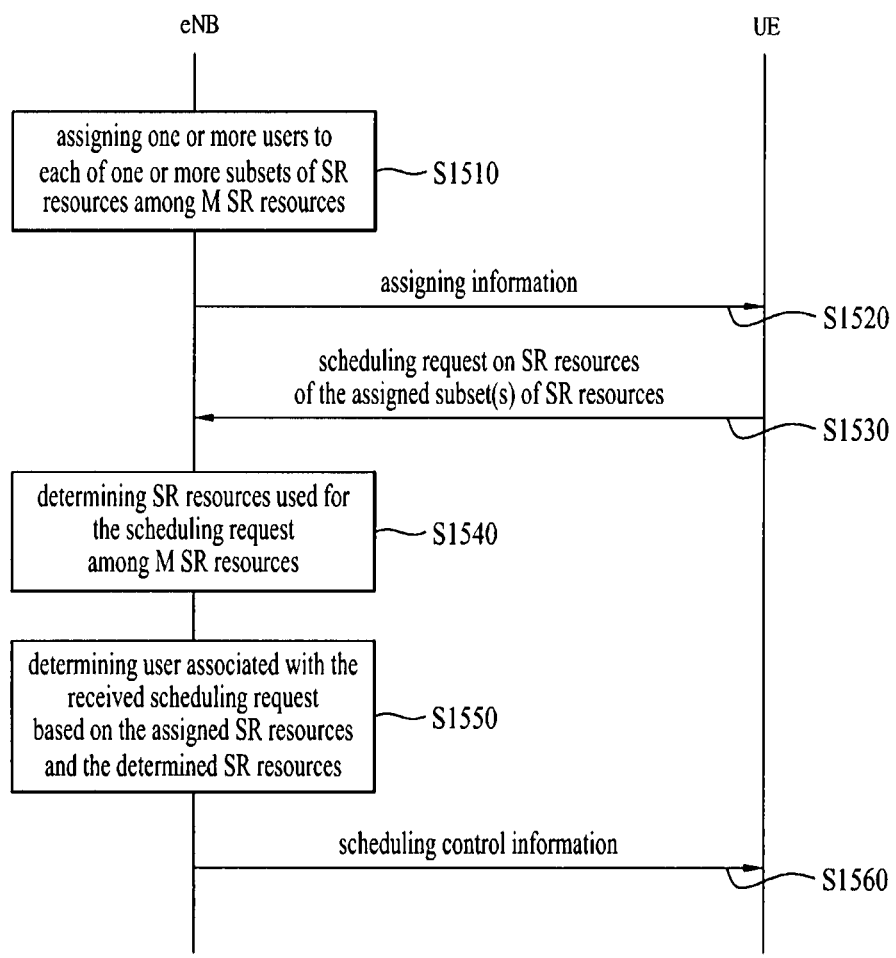
FIG. 15 is a flowchart illustrating a method of transmitting and receiving a scheduling request according to the present invention.

In the method of transmitting and receiving the SR according to the present invention described in association with FIG. 15, the matters described in the various embodiments of the present invention may be independently applied or two or more embodiments may be simultaneously applied. For clarity, repeated descriptions will be omitted.

Separately from the operation for aggregating and/or generating the SR of the relay described with reference to FIGS. 12 and 13, the principle of the present invention is applicable to an operation for enabling one or more relays to transmit an uplink SR for backhaul uplink transmission using the shared SR resource based filtering method and enabling a BS to detect (or filter) a relay which has transmitted the uplink SR and an operation for enabling one or more users to transmit an uplink SR for access uplink transmission using the shared SR resource based filtering method and enabling a relay to detect (or filter) a user which has transmitted the uplink SR.

Figure 16:
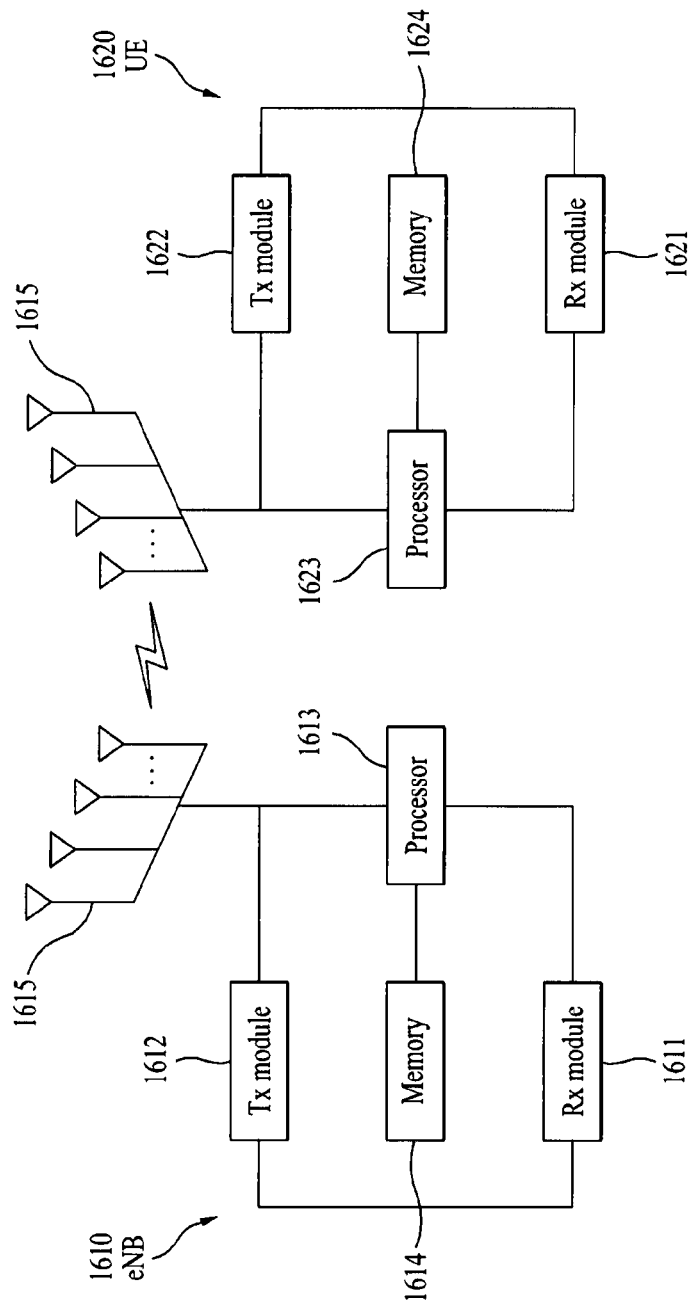
FIG. 16 is a diagram showing the configuration of an eNB device and a UE according to the present invention.

FIG. 16 is a diagram showing the configuration of an eNB device and a UE according to the present invention.

Referring to FIG. 16, the eNB device 1610 according to the present invention may include a reception (Rx) module 1611, a transmission (Tx) module 1612, a processor 1613, a memory 1614 and a plurality of antennas 1615. Since the plurality of antennas 1615 is used, the eNB device supports MIMO transmission and reception. The Rx module 1611 may receive a variety of signals, data and information from a UE in uplink. The Tx module 1612 may transmit a variety of signals, data and information to a UE in downlink. The processor 1613 may control the overall operation of the eNB device 1610.

The eNB device 1610 according to one embodiment of the present invention may be configured to support an SR using shared resources. The processor 1613 of the eNB device may be configured to assign one or more users to each of one or more subsets of SR resources in a set including M SR resources. In addition, the processor 1613 may be configured to receive SRs of one or more users through the Rx module 1611. In addition, the processor 1613 may be configured to determine SR resources used for the SR among the M SR resources. The processor 1613 may be configured to determine one or more users associated with the received SR based on the SR resources assigned to each user and the SR resources which are determined to be used for the SR. In addition, the processor 1613 may be configured to transmit scheduling control information to one or more users who are determined to be associated with the SR through the Tx module 1612.

The processor 1613 of the eNB device 1610 serves to process information received by the eNB device 1610 and information to be transmitted and the memory 1614 may store the processed information for a predetermined time and may be replaced with a component such as a buffer (not shown).

Referring to FIG. 16, the UE 1620 of the present invention includes a reception module (Rx) module 1621, a transmission (Tx) module 1622, a processor 1623, a memory 1624 and a plurality of antennas 1625. When the plurality of antennas 1625 is used, the UE supports MIMO transmission and reception. The Rx module 1621 may receive a variety of signals, data and information from the eNB in downlink. The Tx module 1622 may transmit a variety of signals, data and information to the eNB in uplink. The processor 1623 may control the overall operation of the UE 1620.

The UE 1620 according to one embodiment of the present invention may be configured to transmit an SR using shared resources. The processor 1623 of the UE may be configured to receive assigning information in which one or more subsets of SR resources in a set including M SR resources are assigned to the UE 1620 or one or more traffic flows of the UE 1620 through the Rx module 1621. The processor 1623 may be configured to transmit the SR using the SR resources of one or more subsets of SR resources based on the assigning information through the Tx module 1622. The processor 1623 may be configured to receive scheduling control information through the Rx module 1621, if SR resources used for the SR among the M SR resources are determined by the eNB 1610 and the UE 1620 is determined by the eNB 1610 as the user associated with the transmitted SR based on the assigned SR resources and the determined SR resources.

The processor 1623 of the UE 1620 serves to process information received by the eNB device 1620 and information to be transmitted and the memory 1624 may store the processed information for a predetermined time and may be replaced with a component such as a buffer (not shown).

The overall configuration of the eNB device and the UE may be implemented by independently applying the matters described in the above-described various embodiments of the present invention or simultaneously applying two or more embodiments. The repeated description will be omitted for clarity.

In the description of FIG. 16, the description of the eNB device 1610 is equally applicable to a relay device as a downlink transmission entity or an uplink reception entity and the description of the UE 1620 is equally applicable to a relay device as a downlink reception entity or an uplink transmission entity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

The invention claimed is:

1. A method for supporting scheduling request using shared resources at a base station, the method comprising:
    assigning each of one or more users to each of one or more subsets of Scheduling Request (SR) resources of a set consisting of a number, M, of SR resources;
    receiving scheduling request for the one or more users;
    determining SR resources used for the scheduling request among M SR resources;
    determining one or more users associated with the received scheduling request based on the assigned SR resources and the determined SR resources; and
    transmitting scheduling control information to determined one or more users,
    wherein each of one or more subsets of SR resources consists of a plurality number, K, K<M, of SR resources, and
    wherein the plurality number of SR resources consisting one subset of SR resources are determined by hash function using an identifier of one user.

2. The method according to claim 1, wherein a portion of the plurality number of SR resources consisting one subset of SR resources overlaps a portion of the plurality number of SR resources consisting another subset of SR resources.

3. The method according to claim 1, the step of determining SR resources comprising:
    generating a M-bit length bit sequence in accordance with whether a signal is detected on each of M SR resources.

4. The method according to claim 3, wherein each bit of the M-bit length bit sequence is set as first logical value if the signal is detected exists on a SR resource corresponding to the each bit and is set as second logical value if no signal is detected on a SR resource corresponding to the each bit.

5. The method according to claim 3, wherein the signal is determined to be detected on a SR resource if a power of signal is greater than or equal to a predetermined reference value on the SR resource.

6. The method according to claim 1, the step of determining one or more user comprising:
    determining the scheduling request for one user is received if the SR resources determined as being used for the scheduling request include all of the SR resources consisting one subset of SR resources assigned to the one user.

7. The method according to claim 1, wherein M SR resources are configured as orthogonal resources by one or combination of two or more of time resource, frequency resource and code resource.

8. A method for transmitting scheduling request using shared resources at a User Equipment (UE), the method comprising:
    receiving assignment information assigning the UE to one or more subsets of Scheduling Request (SR) resources of a set consisting of a number, M, of SR resources;
    transmitting scheduling request using SR resources of the one or more subsets of SR resources based on the assigning information; and
    receiving scheduling control information if SR resources used for the scheduling request among M SR resources are determined by a base station and if the UE is determined as a user associated with the transmitted scheduling request based on the assigned SR resources and determined SR resources by the base station,
    wherein each of one or more subsets of SR resources consists of a plurality number, K, K<M, of SR resources, and
    wherein the plurality number of SR resources consisting one subset of SR resources are determined by hash function using an identifier of one user.

9. The method according to claim 8, wherein a portion of the plurality number of SR resources consisting one subset of SR resources overlaps a portion of the plurality number of SR resources consisting another subset of SR resources.

10. The method according to claim 8, wherein the determination of the SR resources used for the scheduling request includes generating a M-bit length bit sequence in accordance with whether a signal is detected on each of M SR resources.

11. The method according to claim 10, wherein each bit of the M-bit length bit sequence is set as first logical value if the signal is detected exists on a SR resource corresponding to the each bit and is set as second logical value if no signal is detected on a SR resource corresponding to the each bit.

12. The method according to claim 10, wherein the signal is determined to be detected on a SR resource if a power of signal is greater than or equal to a predetermined reference value on the SR resource.

13. The method according to claim 8, wherein the determination of the UE as a user associated with the transmitted scheduling request includes determining the scheduling request is transmitted from the UE if the SR resources determined as being used for the scheduling request include all of the SR resources consisting one subset of SR resources assigned to the UE.

14. The method according to claim 8, wherein M SR resources are configured as orthogonal resources by one or combination of two or more of time resource, frequency resource and code resource.

15. A base station for supporting scheduling request using shared resources, the base station comprising:
    a reception module for receiving uplink signal from one or more users;
    a transmission module for transmitting downlink signal to the one or more users; and
    a processor for controlling the base station including the reception module and the transmission module, wherein the processor is configured to:
assign each of the one or more users to each of one or more subsets of Scheduling Request (SR) resources of a set consisting of a number, M, of SR resources;
receive, through the reception module, scheduling request for the one or more users;
determine SR resources used for the scheduling request among M SR resources;
determine one or more user associated with the received scheduling request based on the assigned SR resources and the determined SR resources; and
transmit, through the transmission module, scheduling control information to determined one or more user,
wherein each of one or more subsets of SR resources consists of a plurality number, K, K<M, of SR resources, and
wherein the plurality number of SR resources consisting one subset of SR resources are determined by hash function using an identifier of one user.

16. A User Equipment (UE) for transmitting scheduling request using shared resources, the UE comprising:
a reception module for receiving downlink signal from a base station;
a transmission module for transmitting uplink signal to the base station; and
a processor for controlling the UE including the reception module and the transmission module,
wherein the processor is configured to:
receive, through the reception module, assignment information assigning the UE to one or more subsets of Scheduling Request (SR) resources of a set consisting of a number, M, of SR resources;
transmit, through the transmission module, scheduling request using SR resources of the one or more subsets of SR resources based on the assigning information; and
receive, through the reception module, scheduling control information if SR resources used for the scheduling request among M SR resources are determined by the base station and if the UE is determined as a user associated with the transmitted scheduling request based on the assigned SR resources and determined SR resources by the base station,
wherein each of one or more subsets of SR resources consists of a plurality number, K, K<M, of SR resources, and
wherein the plurality number of SR resources consisting one subset of SR resources are determined by hash function using an identifier of one user.

* * * * *